US005866645A

United States Patent [19]
Pinnavaia et al.

[11] Patent Number: 5,866,645
[45] Date of Patent: Feb. 2, 1999

[54] HOMOSTRUCTURED MIXED ORGANIC AND INORGANIC CATION EXCHANGED TAPERED COMPOSITIONS

[75] Inventors: Thomas J. Pinnavaia, East Lansing, Mich.; Heng-Zhen Shi, Zhoukon Henan, China; Tie Lan, Palatine, Ill.

[73] Assignee: Board of Trustees operating Michigan State University, East Lansing, Mich.

[21] Appl. No.: 749,149

[22] Filed: Nov. 14, 1996

[51] Int. Cl.$^6$ ...................................................... C08K 3/34
[52] U.S. Cl. ................................................................ 524/443
[58] Field of Search ............................................. 524/443

[56] References Cited

U.S. PATENT DOCUMENTS

| | | | |
|---|---|---|---|
| 3,432,370 | 3/1969 | Bash et al. | 149/19 |
| 3,511,725 | 5/1970 | Stevens et al. | 149/19 |
| 3,847,726 | 11/1974 | Becker et al. | 161/186 |
| 4,159,994 | 7/1979 | Seto | 260/448 |
| 4,434,075 | 2/1984 | Mardis | 524/236 |
| 4,683,259 | 7/1987 | Goodman | 524/447 |
| 4,732,747 | 3/1988 | Garces | 423/328 |
| 4,810,734 | 3/1989 | Kawasuir | 523/216 |
| 4,889,885 | 12/1989 | Usuki et al. | 524/445 |
| 5,283,043 | 2/1994 | Johnson | 423/328.2 |
| 5,310,715 | 5/1994 | Kresge | 502/84 |
| 5,508,081 | 4/1996 | Inagaki | 428/116 |
| 5,552,469 | 9/1996 | Beall et al. | 524/445 |
| 5,578,672 | 11/1996 | Beall | 524/446 |

FOREIGN PATENT DOCUMENTS

| | | |
|---|---|---|
| 1004859 | 2/1977 | Canada . |
| 93/04117 | 3/1993 | WIPO . |
| 93/04118 | 3/1993 | WIPO . |
| 96/08526 | 3/1995 | WIPO . |
| 95/14733 | 6/1995 | WIPO . |

OTHER PUBLICATIONS

Barrer, R.M. and K. Drummer, Trans. Faraday Soc. 59:959–968 (1963).
Theng, B.K.G., et al., Clay Miner. 7:1–17 (1967).
Ijdo et al, Advanced Materials 8:79–83 (1996).
McBride, M.B., et al., Clay Miner. 10:357 (1975).
Xu, S., et al., Soil Sci. Soc. Am. J., 58:1382–1391 (1994).
Vansant, E.F., et al., Clays Clay Miner 20:47–54 (1972).
McBride, M.B., et al., Clays Clay Minerals 21:323–329 (1973).
Lee, J.F., et al., J. Chem. Soc. Faraday Trans. I, 85:2953–2962 (1989).
Kato, C., et al., Clays Clay Miner. 27 129 (1979).
Sugahara, Yl, et al., J. Ceram. Soc. Jpn. 100 413 (1992).
Vaia, R.A., et al., Chem. Mater. 5 1694 (1993).
Messersmith, P.B., et al., Chem. Mater. 5 1064 (1993).
Fukushima, Y., et al., J. Inclusion Phenom. 5 473 (1987).
Fukushima, Yl, et al., Clay Miner. 23 27 (1988).
Usuki, A., et al., J. Mater. Res. 8 1179 (1993).
Kojima, Y., et al., J. Mater. Res. 8 1185 (1993).
Lan, T. and Pinnavaia, T.J., Chem. Mater. 6 2216 (1994).
Lan, T. and T.J. Pinnavaia, Proceedings of ACS PMSE 71:527 (1994).
Messersmith et al, Chem. Mater. 1719–1725 (1994).
Giannelis, E.P. JOM 44 28 (1992).
Gleiter, H. Adv. Mater. 4 474 (1992).
Novak, B.M., Adv. Mater. 5 422 (1993).
Pinnavaia, T.J., Science 220 365 (1983).
Kirk–Othmer, John Wiley ? Sons 9 267–290 (1980).

*Primary Examiner*—Paul R. Michl
*Attorney, Agent, or Firm*—Ian C. McLeod

[57] ABSTRACT

Homostructured, cation exchanged, layered compositions containing mixed onium and alkali metal, alkaline earth metal, protonated hydronium ions and mixtures thereof are described. Particulate concentrates formed by intercalation of a polymer component into the galleries of the layered inorganic and organic homostructured layered cation exchange composition and to the use of the particulate concentrates for the preparation of cured polymer-inorganic nanolayer hybrid composite compositions are described. In the most preferred embodiment of the invention the layered inorganic composition is selected from the family of 2:1 layered silicate clays.

46 Claims, 4 Drawing Sheets

FIG. 5A
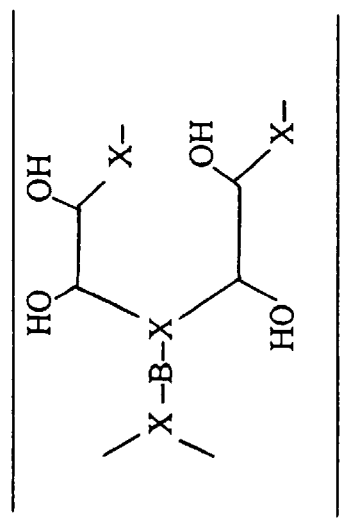
X–B–X, an epoxy curing agent (X is an epoxy crosslinking group e.g., amine, amide)
+
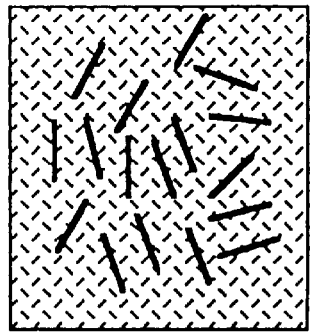
a bi- or multifunctional epoxy
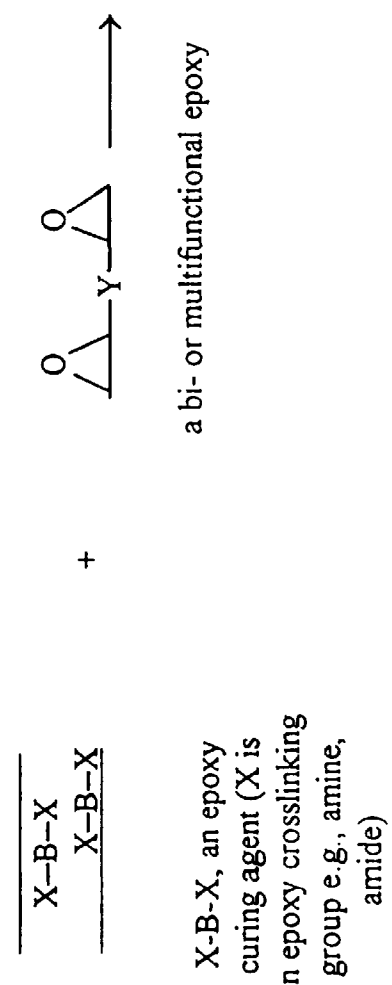
Cured epoxy polymer silicate nanolayer composite
FIG. 5B
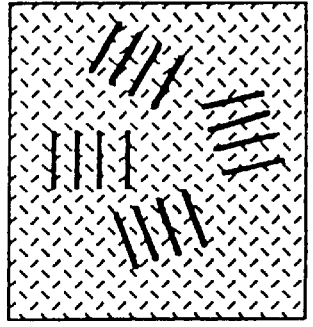
Ordered nanocomposite, nanolayers equally spaced by intercalated polymer matrix.
FIG. 5C
Disordered nanocomposite, containing exfoliated silicate nanolayers.

HOMOSTRUCTURED MIXED ORGANIC AND INORGANIC CATION EXCHANGED TAPERED COMPOSITIONS

BACKGROUND OF THE INVENTION

1. Summary of the Invention

The present invention relates to a homostructured cation exchanged layered lattice compositions which have the gallery cation exchanged sites co-occupied by mixtures of onium ions and by protons or alkali metal or alkaline earth metal ions. The present invention also relates to particulate compositions formed by providing a polymer polymerizing component in the homostructured layered lattice composition and to the use of the particulate compositions for the preparation of cured polymer-inorganic nanolayer hybrid composite compositions. In the most preferred embodiment of the invention the layered lattice inorganic composition is selected from the family of 2:1 layered silicate cation exchangers.

2. Description of the Related Art

Smectite clays are natural or synthetic layered aluminosilicates such as montmorillonite, bentonite, hectorite, fluorohectorite, saponite, beidellite, nontronite, and related analogs. Smectite clays have layered lattice structures in which the tactoids (crystallites) consist of stacked two-dimensional oxyanions separated by layers of hydrated cations. The oxygen atoms define layers approximately 10 Å-thick, containing two sheets of tetrahedral sites and a central sheet of octahedral sites. The 2:1 relation between the tetrahedral and the octahedral sheets in a layer defines 2:1 layered silicates. For a typical 2:1 layered silicate, such as montmorillonite, the layer is made up of a central octahedral sheet, usually occupied by aluminum or magnesium, sandwiched between two sheets of tetrahedral silicon sites. Various isomorphous cation substitutions, e.g., $Si^{4+}$ by $Al^{3+}$ in the tetrahedral sheet, or $Al^{3+}$ by $Mg^{2+}$, or $Mg^{2+}$ by $Li^+$ in the octahedral sheet, among others, also result in negatively charged nanolayers. These negatively charged layers are separated by hydrated cations such as alkali or alkaline earth metal ions in the gallery (interlayer) regions between the 2:1 layered silicates. The negative charge on the layer is balanced by interlayer or "gallery" cations, normally $Ca^{2+}$ and $Na^+$. The gallery cations in a natural smectite can be replaced by simple ion exchange process with almost any desired cation, including alkylammonium alkyl phosphonium and other organic cations. Some idealized unit cell compositions and layer charge densities of smectite clays are listed in Table 1.

TABLE 1

Ideal Structural Formulas for some 2:1 Layered Silicates

| Mineral Name | Ideal Formula | Layer Charge Density per $O_{20}$ unit |
|---|---|---|
| Hectorite | $M_{x/n}^{n+} \cdot yH_2O[Al_{6.0-x}Mg_x](Si_{8.0})O_{20}(OH)_4$ | 0.4–1.2 |
| Fluorohectorite | $M_{x/n}^{n+} \cdot yH_2O[Al_{6.0-x}Mg_x](Si_{8.0})O_{20}(OH,F)_4$ | 0.4–1.2 |
| Montmorillonite | $M_{x/n}^{n+} \cdot yH_2O[Mg_{6.0-x}Li_x](Si_{8.0})O_{20}(OH)_4$ | 0.6–1.0 |
| Nontronite | $M_{x/n}^{n+} \cdot yH_2O[Fe_{4.0}](Si_{8.0-x}Al_x)O_{20}(OH)_4$ | 0.6–1.0 |
| Beidellite | $M_{x/n}^{n+} \cdot yH_2O[Al_{4.0}](Si_{8.0-x}Al_x)O_{20}(OH)_4$ | 0.8–1.0 |
| Saponite | $M_{x/n}^{n+} \cdot yH_2O[Mg_{6.0}](Si_{8.0-x}Al_x)O_{20}(OH)_4$ | 0.6–1.2 |

TABLE 1-continued

Ideal Structural Formulas for some 2:1 Layered Silicates

| Mineral Name | Ideal Formula | Layer Charge Density per $O_{20}$ unit |
|---|---|---|
| Vermiculite | $Mg_{(x-z)/2}^{2+}[Mg_{6-z}Fe_z^{III}](Si_{8-x}Al_x)O_{20}(OH)_4$ | 1.2–1.4 |
| Muscovite mica | $K_2[Al_{4.0}](Si_{6.0}Al_{2.0})O_{20}(OH)_4$ | 2.0 |
| Biotite mica | $K_2[Al_yMg_{6+(x/2)-(3y-2)}](Si_{6.0-x}Al_{2.0+x})O_{20}(OH)_4$ (x<1, y<2) | 2.0 |
| Phlogopite mica | $K_2[Mg_{6.0}](Si_{6.0}Al_{2.0})O_{20}(OH)_4$ | 2.0 |

Included in Table 1 for comparison purpose are the idealized compositions of 2:1 layered silicates, smectite clays, vermiculite, muscovite mica, biotite mica, and phlogopite mica. Vermiculite has a layer charge density higher than a smectite but lower than a mica. Micas usually have layer charge of 2.0. The gallery cations in a vermiculite or a mica can also be replaced by ion exchange, but the exchange processes are generally slower than for smectite clays. Also, vermiculites and micas exist commonly as single crystals that range in size from 10 $\mu$m to 10 cm or larger. In contrast, smectite clays have sub-micron particle sizes. The particle size of vermiculite and mica can be reduced to the micron size range by mechanical grinding. Other ion exchangeable 2:1 layered silicate including illite, rectorite and synthetic derivative such as tetrasilicic mica and synthetic mica montmorillonite (SMM).

Those skilled in the art will know that smectites are members of a more universal class of layered inorganic ion exchangers. Many other layered inorganic cation exchanger materials can be selected in place of smectites. These layered materials include crystalline sheet silicate, layered phosphates, arsenates, sulfates, titanates and niobates.

The crystalline sheet silicates include kenyaite: $Na_2Si_{20}O_{41} \cdot 10H_2O$; magadite: $Na_2Si_{20}O_{41} \cdot 3H_2O$; makatite: $Na_2Si_4O_9 \cdot 3H_2O$; kanemite: $NaHSi_2O_5 \cdot 3H_2O$; revdite: $Na_2Si_2O_5 \cdot 5H_2O$; Grumantite: $NaHSi_2O_5 \cdot 0.9H_2O$; and Ilerite (octosilicate): $Na_2Si_8O_{17}$.

The layered phosphates, arsenates, titanates and niobates are listed as follows:

TABLE 2

| Class | Compound general formula |
|---|---|
| Phosphates | $H_2\{M^{IV}(PO_4)_2\} \cdot xH_2O$, ($M^{IV}$ = Zr, Ti, Ge, Sn, Pb) $CaPO_4R \cdot H_2O$ (R = $CH_3$, $C_2H_5$), $VOPO_4 \cdot 2H_2O$, $NboPO_4 \cdot 3H_2O$, $H\{SnCl (OH) PO_4\} \cdot 2H_2O$. |
| Arsenates | $H_2\{M^{IV}(As_4)_2\} \cdot xH_2O$, $H\{MnAsO_4\} \cdot H_2O$ (krautite), $H\{SnCl (OH) AsO_4\} \cdot 2H_2O$ |
| Titanates | $Na_2Ti_3O_7$, $K_2Ti_4O_9$, $Na_4Ti_9O_{20} \cdot xH_2O$, $K_2Ln_2Ti_3O_{10} \cdot H_2O$ |
| Vanadates | $KV_3O_8$ |
| Niobates | $KTINbO_5$, $CSTi_2NbO_7$, $A_3Ti_5NbO_{14}$, (A = Li, Na, K, Rb, Cs, Tl), $KNb_3O_8$, $K_4Nb_6O_{17}$, $ACa_2Nb_3O_{10}$, (A = K, Rb, Cs) |
| Molybdates | $MoO_3(OH)$, $H_xMoO_3$ |
| Uranyl Compound | $H\{UO_2PO_4\} \cdot 4H_2O$, $H\{UO_2AsO_4\} \cdot 4H_2O$ |
| Manganates | Busertite |

Most important among the properties of smectite clays is the ability to replace the gallery cations in the pristine clay with almost any desired cations by ion exchange reactions. The exchange cations are very important in determining the ability of the gallery regions to imbibe (intercalate) neutral molecules. Inorganic cations ($M^{n+}$) such as ($Na^+$, $Ca^{2+}$ and the like) prefer to be solvated by polar molecules such as water and certain polar organic molecules. Thus, these exchange forms are readily swollen by polar molecules, especially by water. Organic cations (alkylammonium, phosphonium ions and the like) are less hydrophilic, even hydrophobic, and prefer to intercalate organic molecules into the gallery regions. Inorganic cations such as $K^+$ and $Mg^{2+}$ in mica are anhydrous and strongly bound to the intergallery surfaces. Therefore, these silicates are difficult for gallery swelling and ion exchange reaction. However, the exchange of gallery cations in micas can be facilitated by reducing the particle size of the particles, preferably to average values of 2 $\mu$m or less.

Clay-organic intercalates are intercalation compounds in which organic molecules enter the clay galleries and form definite compositions with specific clay basal spacings. The organic compounds that have been reported to form clay intercalates include uncharged polar organic compounds and positively charged organic ions, and ion-paired organic salts. These classes of guest species are intercalated by ion exchange, physical adsorption, or other mechanisms. Intercalation of organic polymers in clay minerals has been recognized to occur as natural processes in soils. Polymer adsorption and desorption also occurs under synthetic conditions (Theng, B.K.G. "The Chemistry of Clay-Organic Reactions", John Wiley & Sons, pages 136 to 206 (1974)). Interaction between clays and polymeric species has been discussed as natural or synthetic polymer adsorption and desorption (Theng, B.K.G. "Formation and Properties of Clay-Polymer Complexes", Elsevier pages 63 to 133 (1979)).

Mixed organic/inorganic ion exchanged forms of 2:1 layered silicates can potentially adopt one of several possible structures depending on the distribution of the distinguishable cations in the interlayer galleries. Organo cations, particularly alkylammonium ions such as $(CH_3)_3NH^+$ and $(CH_3)_4N^+$ among others, are known to form interstratified structures when mixed with $Na^+$ ions in the galleries of montmorillonite (Barrer, R. M. and K. Brummer, Trans. Faraday Soc. 59:959–968 (1963); and Theng, B. K. G., et al., Clay Miner. 7:1–17 (1967)). In these interstratified phases the galleries are occupied by "onium-rich" and "sodium-rich" compositions of exchange cations. That is, the organic and inorganic exchange cations are "demixed" or largely segregated into separate galleries. Also, the stacking sequence of "onium-rich" and "sodium-rich" galleries is random in an interstratified mixed ion system. Interstratified onium ion/alkali metal ion smectite clays typically exhibit XRD spacings that increase with the amount of the larger onium ion occupying exchange positions in the galleries.

The segregation of organic onium ions and inorganic cations also has been recently observed for mixed ion exchange form of fluorohectorite containing equal molar amounts of a quaternary phosphonium ion, namely, $(C_{18}H_{37})P(C_4H_9)_3^+$, and an alkali metal ion, namely, $Li^+$, $Na^+$, or $K^+$ (Ijdo et al, Advanced Materials 8:79–83 (1996)). In these latter compositions the organic and inorganic ions also are segregated into separate galleries, but unlike interstratified systems the stacking sequence of inorganic and organic galleries regularly alternates. This regular sequencing of galleries gives rise to ordered heterostructures that exhibit several orders of rational 00l reflections.

Yet another common behavior of mixed organic/inorganic exchange cation clays is the segregation of the two types of ions into homoionic tactoids containing long range stacking sequences of galleries that are occupied predominantly by one or the other cation. That is, the replacement of inorganic exchange ions by organic exchange ions occurs sequentially, gallery by adjacent gallery. Thus, if a fraction of the inorganic cations in a sample is replaced by organic ions, then one is left with a mixture of tactoids consisting of two homoionic end-member ion exchanged forms. These phase segregated mixed ion clays typically exhibit XRD powder patterns characteristic of a physical mixture of the homoionic, end-member forms of the parent organic and inorganic cation exchanged clays.

Randomly interstratified, heterostructured (regularly interstratified), and phase segregated mixed organic/inorganic ion clays and related 2:1 layered silicates have limited utility for commercial applications. The distributions of inorganic cations (I) and organic cations (O) in each of these three systems is schematically illustrated in FIG. 1, parts A, B, and C, respectively. Because the organic exchange cations in each of these structures are largely segregated from the inorganic cations in separate organic-rich galleries, only those organic-rich galleries will be hydrophobic and suitable for intercalation and swelling by organic reagents and solvents.

It is the hydrophobicity of homoionic organic cation exchanged clays that makes them useful as materials for rheological control agents (e.g., in oil well drilling fluids, cosmetic formulations, and household cleaning products), adsorbents for toxic organic chemicals from water, and as components for organic polymer-layered silicate nanocomposite formation. Consequently, only the organic cation rich galleries of interstratified, heterostructured and phase-segregated mixed ion clays will be useful. The fraction of the clay containing inorganic-cation rich galleries will not participate in the desired intercalation chemistry with organic reagents, solvents and polymers. For this reason, fully exchanged homoionic organo clays, most typically quaternary ammonium ion clays, are used for the said applications.

One way of reducing the amount of expensive organic cations needed for hydrophobic intercalation and swelling is to mix organic and inorganic cations within the same galleries. Such mixed exchange cation forms may be said to be "homostructured" because each gallery in the tactoid would be compositionally equivalent and would exhibit uniform intercalation properties. The gallery distribution of inorganic ions (I) and organic ions (O) in a homostructured mixed ion intercalate is shown schematically in FIG. 1D. Homostructured organic/inorganic ion exchanged clays could in principle be made hydrophilic, hydrophobic, or even amphophilic depending on the relative population of organic or inorganic ions in the gallery. By adjusting the polarity of the galleries one can favor adsorption of guest species based on their intrinsic polarity. Also amphiphilic galleries would allow co-adsorption of both organic and inorganic reagents for possible intragallery reaction. Still further, it should be possible using hydrophobic derivatives to adsorb organic reagents in galleries where the inorganic cation is an element capable of catalyzing reaction of the organic reagent (e.g. a transition metal ion). Despite the anticipated advantages of homostructured mixed ion clays, these structures are rare and very limited in the range of organic ion to inorganic exchange cation ratio. It has been suggested on thermodynamic grounds by Vansant and Uytterhoeven that homogeneous mixing of two exchange cations in every gallery should be possible, but such systems are very difficult to realize in practice. For instance, McBride and Mortland (McBride, M. B., et al., Clay Miner. 10:357 (1975))

observed random interstratification of ions in the replacement of $Cu^{2+}$ ions by tetramethyl ammonium ions in montmorillonite. Also, Xu and Boyd (Xu, S., et al., Environ. Sci. Technol. 29:312–320 (1995); and Xu, S., et al., Soil Sci. Soc. Am. J., 58:1382–1391 (1994)) observed the segregation of $(C_{16}H_{33})N(CH_3)_3^+$ and $Ca^{2+}$ cations in the galleries of vermiculite.

Demixed organic/inorganic ion exchanged forms of 2:1 layered silicates can adopt one of several possible structures that are distinguished on the basis of the distribution of the two types of cations in the interlayer galleries. Barrer and Brummer (Barrer, R. M. and K. Brummer, Trans. Faraday Soc. 59:959–968 (1963)) studied by X-ray diffraction the basal spacings and adsorption properties of a series of mixed $CH_3NH_3^+$,$Na^+$- and $(CH_3)_4N^+$, $Na^+$-montmorillonites. The mixed ion compositions were prepared by ion exchange of $Na^+$-montmorillonite with aqueous solution of the onium ion salt. They concluded that the compositions were "interstratified" structures. In these interstratified phases, the galleries are occupied by onium-rich and sodium-rich compositions of the exchange cations. That is, the organic and inorganic cations are largely segregated into separate galleries. Also, the stacking sequence of onium-rich and sodium-rich galleries is random. The structure of a randomly interstratified, mixed ion 2:1 layered silicate is illustrated schematically in FIG. 1A.

Theng et al (Theng, B.K.G., et al., Clay Miner 7:1–17 (1967)) also have studied the replacement of $Na^+$ and $Ca^{2+}$ ions in montmorillonite by ion exchange reaction with alkylammonium ions in aqueous solution. They concluded, in agreement with Barrer and Brummer, that the products had interstratified, demixed structures.

Vansant and Uytterhoven (Vansant, E. F., et al., Clays Clay miner 20:47–54 (1972)) studied by thermodynamic methods the partial replacement of $Na^+$ by $(CH_3)NH_3^+$, $(C_2H_5)NH_3^+$ $(C_3H_7)NH_3^{30}$ and $(C_4H_9)$ $NH_3^+$ onium ions in montmorillonite. They were inclined to interpret their results in terms of homogeneous mixtures of onium ions and $Na^+$ ions in the galleries (i.e. in terms of a homostructure), but they believed that segregation of the ions into sodium-rich and onium-rich ions occurred upon drying the reaction products.

The homogeneous or uniform mixing of organic and inorganic cations in a smectite clay over an appreciable range of organic to inorganic cation ratios is very rare and limited to one very special reaction system in the known art. Thus, McBride and Mortland (McBride, M. B., et al., Clay Miner. 10:357 (1975)) observed that for the exchange of $Cu^{2+}$ ions in montmorillonite by tetrapropylammonium ions, random interstratification of $Cu^{2+}$ and tetrapropylammonium ions occurred up to 55% exchange. At 55% exchange, and beyond, the $Cu^{2+}$ and tetrapropylammonium ions were distributed as in a homostructured mixed ion clay. This special behavior for homostructure formation, which is schematically illustrated in FIG. 1D, was attributed to the special ability of $Cu^{2+}$ to reduce the degree of hydration by lowering the number of coordinated water molecules from six to four or less. Other inorganic cations do not show like reduction and stability in coordination number and do not form thermodynamically stable mixed ion clay homostructures.

In their studies of the replacement of alkali metal cations ($Na^+$) and alkaline earth cations ($Ca^{2+}$) in vermiculite by a long chain quaternary of the type used for forming organo clays (hexadecyltrimethylammonium, $HDTMA^+$) Xu and Boyd (Xu, S., et al., Soil Sci. Soc. Am. J. 58:1382–1391 (1994)) provided examples of "entrapped" mixed ion structures. At $Na^+$ and $Ca^{2+}$ concentrations of 0.005M and 0.001M, respectively, the inorganic cations became difficult to exchange after a certain mole fraction of (–0.6) of exchange sites were occupied by $HDTMA^+$. The inability to displace all of the inorganic cations was attributable to an entrapment phenomenon that limited access to the inorganic exchange sites. Entrapment of the inorganic cation was caused by rapid edge collapse of the galleries around the organic onium ion. Greenland and Quirk, (Greenland, D. J., et al., Clays Clay Minerals 9:484–499 (1962), observed that hexadecylpyridinium entrapped up to 25% of the $Na^+$ in montmorillonite. Also, McBride and Mortland, (McBride, M. B., et al., Clays Clay Minerals 21:323–329 (1973)), observed that while tetrapropyl ammonium replaced 50% of the $Ca^{2+}$ from montmorillonite, and only 10% of the inorganic ions were replaced from vermiculite. McAtee, (McAtee, J. L., J. C. American Mineralogist 44:1230–1236 (1959)) observed that long chain quaternary ammonium ions displaced most of the $Na^+$ ions from montmorillonite, but entrapped a large fraction of $Ca^{2+}$ at the exchange sites of the same mineral.

Inorganic cation entrapment by organic cations in 2:1 layered silicates can occur by several mechanisms that include a "covering-up" of the inorganic ion by the larger organic cation or a "contraction" of the gallery due to the presence of organic cation. Gallery contraction, however, is not a general mechanism because it requires a small organic cation capable of keying into the layered silicate surfaces to reduce the gallery height. Most onium ions expand the gallery relative to the size of the inorganic cation. Xu and Boyd have pointed out that both the "covering-up" and "gallery contraction" mechanisms are unlikely for onium ion with long alkyl chains. Instead, they favored entrapment. In this mechanism replacement of the alkali metal or alkaline earth cation by the alkyl chains on the onium ions near the edges of the gallery create a hydrophobic barrier that impedes diffusion of the equated inorganic ions from the gallery. Thus, as illustrated in FIG. 1E, entrapped mixed organic-inorganic cation clays and related 2:1 layered silicates contain both types of ions within a given gallery, but in contrast to the homostructured forms illustrated in FIG. 1D, the ions of entrapped structures are not homogeneously distributed within the galleries and, therefore, are distinct.

Because the organic and inorganic ions are segregated within a gallery, that are entrapped mixed ion structures suffer the same disadvantages that are caused by demixing in phase segregated, interstratified, and heterostructured mixed ion structures. However, as emphasized by Xu and Boyd, entrapped structures are caused by hydrophobic and stearic factors and thus are metastable structures formed in a non-equilibrium exchange process. Phase segregated, interstratified, and heterostructured systems are thermodynamically stable phases formed in equilibrium exchange in an aqueous environment.

On the basis of the current state of the art, the mixing of organic and inorganic exchange cations in smectite clays and related 2:1 layered silicates is limited to compositions in which the fraction of the inorganic exchange cation (alkali metal alkaline earth metal or protons) represents less than 10% of the total cation exchange capacity. Moreover, ion mixing is further limited to onium ions with very short alkyl groups as in the mixed $N(CH_3)_4^+/Cu^{2+}$ and $N(C_3H_7)_4^+/Cu^{2+}$ systems of McBride and Mortland (McBride, M. B., et al., Clay Miner. 10:357 (1975)). Related work by Lee et al (Lee, J.-F., et al., J. Chem. Soc. Faraday Trans. I, 85:2953–2962 (1989)) postulates on the basis of surface area measurements that a small alkylammonium ion, namely $N(CH_3)_4^+$, will randomly displace $Ca^{2+}$ ions on the gallery exchange sites of a smectite clay. But those skilled in the art will know that these homostructured mixed ion clays containing short alkyl groups would not be useful replacements for conventional, homoionic, long chain alkylammonium exchanged forms of smectite clays, because the short chains alkyl onium ions would lack the hydrophobic character needed to cause gallery intercalation and swelling by organic agents.

Among the various applications of organo clays, their use as reinforcing agents, barrier components and Theological control agents for organic polymers is of great commercial value. In general, the polymer-clay composites can be divided into three categories: conventional composites, intercalated nanocomposites, and exfoliated nanocomposites. In a conventional composite, the clay tactoids exist in their original state of aggregated layers with no intercalation of the polymer matrix between the layers of the clay. The polymer contacts the external surfaces of the clay particles (tactoids) exclusively. In an intercalated nanocomposite the insertion of polymer into the clay layer structure occurs in a crystallographically regular fashion, regardless of the clay-to-polymer ratio. An intercalated nanocomposite normally is interlayered by only a few molecular layers of polymer and the properties of the composite typically resemble those of the ceramic host (Kato, C., et al., Clays Clay Miner. 27 129 (1979); Sugahara, Y., et al., J. Ceram. Soc. Jpn. 100 413 (1992); Vaia, R. A., et al., Chem. Mater. 5 1694 (1993); and Messersmith, P. B., et al., Chem. Mater. 5 1064 (1993)). See also U.S. Pat. No. 4,683,259 to Goodman. In contrast, in an exfoliated nanocomposite, the individual 10-Å-thick clay layers are separated in a continuous polymer matrix by average distances that depend on loading. Usually, the clay content of an exfoliated clay composite is much lower than that of an intercalated nanocomposite. Consequently, an exfoliated nanocomposite has a monolithic structure with properties related primarily to those of the starting polymer.

The exfoliation of smectite clays in a polymer matrix provides 10 Å-thick silicate layers with high in-plane bond strength and aspect ratios comparable to those found for fiber-reinforced polymer composites. The clays used for nanocomposite formation are ion-exchanged forms of smectite clays in which the $Na^+$ and/or $Ca^{2+}$ gallery cations of the pristine mineral have been replaced by organic onium ions. The onium ions may be protonated primary amines ($RNH_3^+$), secondary amines ($R_2NH_2^+$), or they may be tertiary amines ($R_3NH^+$) or quaternary ammonium ions ($R_4N)^+$. The alkyl groups attached to nitrogen may be the same or different, and the alkyl groups may be replaced in part by a benzyl group ($-CH_2-C_6H_5$), a phenyl group ($-C_6H_5$) or by benzyl and phenyl groups. The alkyl groups may also be functionalized, as protonated $\alpha$, $\epsilon$-amino acid with the general formula $(H_3N-(CH_2)_n-COOH)^+$. Phosphonium ions may be used in place of ammonium ions for the formation of clay polymer nanocomposites.

Exfoliated clay nanocomposites formed between organo-cation exchanged montmorillonites and thermoplastic nylon-6 have recently been described (Fukushima, Y., et al., J. Inclusion Phenom. 5 473 (1987); Fukushima, Y., et al., Clay Miner. 23 27 (1988); and Usuki, A., et al., J. Mater. Res. 8 1179 (1993); and WO 93/04117 and 93/04118 describing thermoplastic polymers). Clay exfoliation in the nylon-6 matrix gave rise to greatly improved mechanical, thermal, and rheological properties, making possible new materials applications of this polymer (Usuki, A., et al., J. Mater. Res. 8 1179 (1993); and Kojima, Y., et al., J. Mater. Res. 8 1185 (1993)). Recently clay-reinforced epoxy nanocomposites have been reported (Lan, T. and Pinnavaia, T. J., Chem. Mater. 6 2216 (1994)) by using alkylammonium exchanged smectite clays in a flexible epoxy matrix. Lan, T. and T. J. Pinnavaia, Proceedings of ACS PMSE 71:527 (1994), Avelch et al, Clay Minerals 29: 169–178 (1994) and Messersmith et al, Chem. Mater. 1719–1725 (1994)); U.S. Pat. No. 4,810,734 to Kawasuir describe various polymer exfoliated clays. PCT WO 95/14733 and PCT 96/08526 describe polymer exfoliated clays. The reinforcement of the exfoliated 10-Å-thick clay layers was very significant. For instance, 15 wt % of the $CH_3(CH_2)_{17}NH_3^+$-montmorillonite in the epoxy matrix increased the tensile strength 10 times and modulus 8 times. The significant reinforcing benefit provided by the silicate was especially significant for a flexible matrix. U.S. Pat. No. 4,889,885 to Usuki et al shows thermoplastic vinyl polymer composites containing clay.

For all the polymer-clay nanocomposites reported to date, alkylammonium onium ions, or $\alpha$, $\omega$-amino acid ions were exchanged into the clay galleries prior to nanocomposite formation, in part, to make the galleries more hydrophobic and better suited for interaction of polymer precursors. These organoclays allow intercalation (access) of monomer species (e.g., $\epsilon$-caprolactam, epoxy resin and curing agent) into the clay gallery (Usuki, A., et al., J. Mater. Res. 8 1179 (1993), Lan, T. and Pinnavaia, T. J., Chem. Mater. 6 2216 (1994)). Upon polymerization reaction, the monomers form a network in the clay gallery regions and a polymer-clay nanocomposite is formed. By controlling the intra- and extragallery polymerization rate of the monomers, exfoliated and intercalated nanocomposites can be prepared.

Alkylammonium exchanged clays also have been used to form polymer-clay compositions by direct polymer melt intercalation (Vaia et al. Chem. Mater., 7 154, (1995)). The process involves heating a polymer-silicate mixture either statically or under shear in an extruder above the softening temperature of the polymer.

In the previous art, the presence of long chain alkyl onium ions in the clay galleries in place of essentially all of the alkali metal cations was essential for allowing the monomer or the pre-formed polymer to migrate into the clay gallery. However, the alkylammonium ions in the gallery can block potentially favorable van der Waals interactions of the polymer matrix with the clay gallery surfaces. Also, the high cost of the alkylammonium ions and complex processing procedures limit the applications of the composites. Furthermore, the alkylammonium ions are toxic and require special handling procedures. Thus reducing the need for alkylammonium exchange cations in forming polymer-inorganic nanolayer composites would be a great practical and economical benefit.

Another problem restricting the use and performance properties of polymer-inorganic nanolayer hybrid composites is the difficulty in forming the composites with the inorganic nanolayers in the preferred exfoliated state. The prior art teaches two general ways of achieving inorganic nanolayer exfoliation in a polymer matrix. One approach is to form the polymer from monomeric polymer precursors or mixtures of polymer precursors in the presence of a layered inorganic ion exchanger interlayered by organic onium ions. However, in many cases the polymerization rate for polymer formation is much slower in the interlayer gallery region of the layered inorganic phase than in the bulk polymer. Consequently, intercalated rather than exfoliated hybrid nanocomposites are formed. Also, this "in situ" polymerization strategy lacks manufacturing versatility in the production of parts with hybrid nanocomposite compositions, because the nanocomposites can only be produced in batches of fixed polymer to inorganic nanolayer ratio.

The second approach to nanocomposite formation mixes a pre-formed thermoplastic polymer with the layered inorganic ion exchanger, typically modified with alkylammonium exchange ions. Melt processing the mixture under applied shear in an extruder can lead to nanocomposite formation under suitable circumstances,. But melt processing is limited to thermoplastics with melting temperatures below the decomposition temperature of the onium exchange cation.

Organic-inorganic hybrid composites can exhibit mechanical properties superior to those of their separate components. To optimize the performance properties of these materials, it is usually desirable to disperse the inorganic components in the organic matrix on a nanometer length scale (Giannelis, E. P. JOM 44 28 (1992); Gleiter, H. Adv. Mater. 4 474 (1992); and Novak, B. M., Adv. Mater. 5 422 (1993)). Smectite clays and other layered inorganic materials that can be broken down into nanoscale building blocks (Pinnavaia, T. J. Science 220 365 (1983)) are useful for the preparation of organic-inorganic nanocomposites.

U.S. Pat. No. 3,432,370 to Bash et al; U.S. Pat. No. 3,511,725 to Stevens et al, U.S. Pat. No. 3,847,726 to Becker et al and Canadian Patent No. 1,004,859 to Nelson show various compositions incorporating epoxy resins. U.S. Pat. No. 5,552,469 to Beall et al also describes polymer exfoliated clays. There are numerous uses for these polymer matrices; however, there is a need to improve the properties of these polymers.

In view of the above limitations of the prior art, more versatile processing compositions and processing methods applicable to both thermoset and thermoplastic polymers are needed in order to more efficiently manufacture a broader range of polymer-inorganic nanolayer hybrid composite compositions.

BRIEF DESCRIPTION OF THE FIGURES

FIG. 5A is a flow diagram showing a schematic representation of a hybrid nanocomposite prepared from a particulate concentrate comprising an epoxy curing agent as the polymer polymerizing component and the onium ion and proton alkali metal or alkaline earth metal ion exchanged form of a smectite clay. FIGS. 5B and 5C are schematic representations of nanocomposite products showing ordered and disordered arrays of exfoliated nanolayers.

OBJECTS

Figures 1, 2:
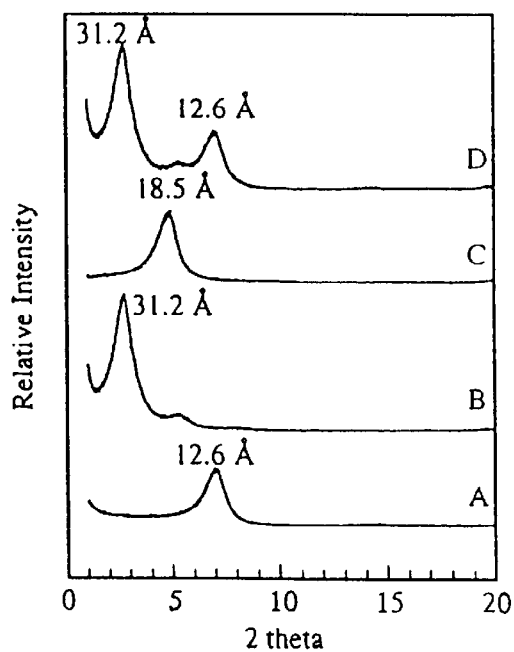
FIG. 1 is a schematic representation of possible structures for mixed organic onium (O) and inorganic ion (I) exchanged forms of 2:1 layered silicates A. Randomly interstratified; B. Regularly Interstratified (heterostructured) tactoid; C. Phase segregated tactoid; D. Homostructured tactoid, and E. Entrapped tactoid. In structures A, B, and C, the two ions are segregated (demixed) into separate galleries and differ in the gallery stacking sequence. In structure D, the two ions mix within the same galleries and all galleries are equivalent. In E the organic and inorganic cations co-occupy the same galleries but the distribution if the ions is not uniform within the gallery.
FIG. 2 is a graph of XRD patterns (Cu—$K_\alpha$) for (A) pristine Na-HECTABRITE AW, a commercial hectorite supplied by American Colloid Corp. (B) fully exchanged 18A-HECTABRITE AW (Example 1) where 18A represents the octadecylammonium ion, (C) Homostructured 18A/Na-HECTABRITE AW, prepared by reaction of 2.8 mmole $(C_{18}H_{37}NH_3^+Br^-$ chloride salt solution and 2 g of Na-HECTABRITE AW in 1:1 (v/v) ethanol:$H_2O$ at 75° C. for a period of 96 hr (Example 3). (D) phase segregated 18A-HECTABRITE AW and Na-HECTABRITE AW obtained by partial ion exchange reaction of 2.8 mmole $(C_{18}H_{37})NH_3^+Br^-$ chloride salt solution and 2 g of Na-HECTABRITE AW in 1:1 (v/v) ethanol:$H_2O$ at 75° C. for a period of 24 hr (Example 2). For samples C and D the molar ratio of onium ion and $Na^+$ is approximately 1:1.

An object of the present invention is to provide novel clay compositions.

A further object of the present invention is to provide for a particulate concentrate composition consisting of a polymer polymerizing component and an inorganic organic cation exchange composition in partially onium exchanged form, that can subsequently be mixed with a polymer precursor, a mixture of polymer precursors or a polymer melt (that is a thermoplastic polymer under melt processing conditions) to form polymer-inorganic nanolayer hybrid composites with improved mechanical performance properties relative to the unreinforced cured polymer.

Another object of the present invention is to provide for hybrid nanocomposite compositions of a cured polymer matrix and inorganic nanolayers, wherein the clay nanolayers function as reinforcement agents and as barriers to permeants, thus improving the strength, dimensional stability and solvent resistance and wherein the initial exchange cations on the inorganic nanolayers are onium ions and protons, alkali metal ions or alkali metal ions.

Another object of the present invention is to provide low cost, high-speed, environmentally benign methods for producing the particulate concentrate compositions and the polymer-inorganic nanolayer hybrid composites.

DESCRIPTION OF PREFERRED EMBODIMENTS

The present invention relates to a homostructured inorganic and organic ion intercalated layered lattice composition which has galleries between the nanolayers co-occupied by onium ions and inorganic ions selected from the group consisting of protons, alkali metal ions and alkaline earth metal ions and mixtures thereof.

The present invention also relates to a method for forming a homostructured layered lattice composition which has galleries between the nanolayers co-occupied by onium ions and inorganic ions wherein the inorganic ion is selected from the group consisting of protons, alkali metal and alkaline earth metal ions and mixtures thereof which comprises: mixing an inorganic ion intercalated layered lattice composition and an onium ion intercalated layered lattice composition in water and a water miscible organic solvent as a reaction mixture at a temperature of 0° C. to 100° C.; and separating the homostructured layered lattice composition from the reaction mixture.

The present invention also relates to a method for forming an inorganic ion and onium ion intercalated homostructured layered composition which has galleries between the nanolayers co-occupied by onium ions and ions selected from the group consisting of protons, alkali metal and alkaline earth metal ions which comprises: mixing an onium compound with an inorganic layered lattice composition which has galleries occupied by the inorganic ions and mixtures thereof in water and a water miscible organic solvent as a reaction mixture at a temperature between about 0° C. and 100° C.; holding the reaction mixture for a period of time so that the homostructured layered lattice composition is formed; and separating the homostructured layered lattice composition from the reaction mixture.

The present invention also provides for a particulate concentrate composition useful for forming a polymer-inorganic nanolayer hybrid composite composition. The polymer composites can be thermosets or thermoplastics. A broad class of layered cation exchange compositions may be utilized as inorganic nanolayers. In the preferred embodiment of the invention a member of the 2:1 layered silicate family of ion exchangers is selected for the formulation of the particulate concentrate composition. Less preferred layered inorganic cation exchanger compositions, including crystalline layered sheet silicates, phosphates, arsenates, titanates, vanadates, niobates, molybdates, manganates and uranyl compounds may be selected.

The particulate concentrate compositions are formed by intercalation of a polymer polymerizing component into the galleries of an exchanged form of the homostructured layered inorganic composition which has cation exchange sites occupied by onium ions and proton, alkali metal or alkaline earth metal ions in the nanolayers in a mole ratio between about 10 to 90 and 90 to 10. A polymer polymerizing component can be defined as any reagent containing a functional group capable of polymerization reaction with a polymer precursor or a mixture of polymer precursors. The polymer polymerizing agent can also contain a basic functional group for reaction with the gallery protons of the inorganic ion exchanger. The functional groups on the polymer polymerizing agent and polymer precursor may be identical or different in chemical structure.

Reaction of the intercalated particulate concentrate with a polymer precursor or mixture of polymer precursors affords a cured polymer-nanolayer hybrid composite with mechanical performance properties greatly superior to the pristine cured composite. A reduction in the number of alkylammonium ions on the exchange sites of the inorganic nanolayers optimizes interfacial interactions and enhances the mechanical strength of the polymer phase. In addition, the cured polymer-nanolayer composites exhibit improved resistance to permeation by gases and to swelling by organic solvents. These latter properties improve the performance of the composites as engineering materials and as barrier films, sealants and the like. Also, the integrity of the composites is improved by the reduction of the alkylammonium ions, thus improving the dimensional stability of the composites in the presence of solvents and the resistance of the composite to crazing and cracking. Furthermore, the adhesive strengths of the elastomeric nanocomposites embodied in this invention is improved by the reduction of alkylammonium ions.

The present invention thus particularly relates to a particulate composition used to prepare a polymer and layered inorganic composition composite which comprises:

a polymer component intercalated into the particles of a layered inorganic composition with nanolayers and with galleries between the nanolayers wherein the layered inorganic composition has cation exchange sites occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10, wherein in use of the particulate composition the nanolayers are separated by a polymer precursor or polymer melt which is introduced into the galleries of the inorganic layered composition and combines with the polymer component and wherein the weight ratio of the polymer component to layered inorganic composition is between about 1:100 and 100:1.

The present invention also relates to a particulate composition used to prepare a polymer and 2:1 layered silicate hybrid composite which comprises:

a polymer component intercalated into particles of a 2:1 layered silicate with nanolayers and with galleries between the nanolayers wherein the 2:1 layered silicate has cation exchange sites occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10; and wherein in use of the particulate composition the nanolayers are separated by a polymer precursor which is introduced into the galleries of the 2:1 layered silicate wherein the weight ratio of the polymer component to the 2:1 layered silicate is in the range 1:100 to 100:1.

The present invention further relates to a hybrid organic-inorganic composite material containing a cured polymer and particles of a layered inorganic composition having galleries between the layers, the galleries containing the polymer, wherein the layered inorganic composition has cation exchange sites occupied by onium ions and inorganic ions selected from the group consisting of protons, alkali metal and alkaline earth metal ions and mixtures thereof in each of the galleries in a mole ratio of onium ions to inorganic ions of between about 10 and 90 and 90 and 10, wherein the ratio by weight of cured polymer to the layered inorganic composition is between about 200:1 and 1:100, wherein an average separation between the layers corresponds to a height of the galleries of about 0.4 to 300 nm and wherein the particles have an average diameter of between about 20 and 20,000 nm and a ratio of diameter to thickness of the particles in a range between about 20,000:1 and 20 to 1.

The present invention also relates to a hybrid organic-inorganic composite material containing a cured polymer and particles of a layered 2:1 layered silicate particles having galleries between the layers, the galleries containing the polymer, wherein the silicate has cation exchange sites which are occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10 prior to curing of the polymer, with the proton bonded to the polymer, wherein the ratio by weight of polymer to layered silicate is between about 200:1 and 1:100, wherein an average separation between the layers corresponds to a height of the galleries of about 0.4 to 300 nm and wherein the particles have an average diameter of between about 20 and 20,000 nm and a ratio of diameter to thickness of the particles in a range between about 20,000:1 and 20 to 1.

The present invention also relates to a method for the preparation of a composition which comprises:

(a) providing a layered inorganic composition and with nanolayers and galleries between the nanolayers and with cation exchanged sites occupied by onium ions and inorganic ions selected from the group consisting of protons, alkali metal and alkaline earth metal ions and mixtures thereof in each of the galleries in a mole ratio of onium ion to inorganic ion between about 10 to 90 and 90 to 10; and (b) intercalating a polymer component into the galleries of the layered inorganic composition, wherein the composition can be used to form a polymer.

The present invention also relates to a method for the preparation of a composition which comprises:

(a) providing a 2:1 layered silicate with nanolayers and galleries between the nanolayers with cation exchanged sites occupied by onium ions and inorganic ions selected from the group consisting of protons, alkali metal and alkaline earth metal ions and mixtures thereof in each of the galleries in a mole ratio of onium ion to inorganic ions of between about 10 to 90 and 90 to 10 prior to curing of the polymer with the proton bonded to the polymer, wherein the ratio by weight of polymer to layered silicate is between about 200:1 and 1:100, wherein an average separation between the layers corresponds to a height of the galleries of about 0.4 to 300 nm and wherein the particles have an average diameter of between about 20 and 200,000 nm and a ratio of diameter to thickness of the particles in a range between about 20,000:1 and 20 to 1; and (b) intercalating a polymer component into the galleries of the 2:1 layered silicate, wherein the composition can be mixed with a polymer.

The present invention also relates to a method for the preparation of a cured polymer composite comprising a polymer component and a layered inorganic component with nanolayers and galleries between the monolayers wherein:

(i) the layered inorganic composition has cation exchange sites occupied by onium ions and inorganic ions selected from the group consisting of protons, alkali metal and alkaline earth metal ions and mixtures thereof in each of the galleries in a mole ratio of onium ion to inorganic ions between about 10 to 90 and 90 to 10;

(ii) a polymer precursor or polymer melt;

(iii) the inorganic layers are separated by the polymer precursor or polymer melt in the galleries; and (iv) the weight ratio of the polymer precursor or polymer melt to the layered inorganic composition is between about 1:100 to 100:1, wherein said method comprises:

(a) providing in a mixture the composition with the polymer precursor or polymer; and (b) mixing the mixture at a temperature and for a time to produce the polymer composite, wherein the galleries contain the polymer.

The present invention further relates to a method for the preparation of a polymer composite prepared from a composition comprising a polymer and a homostructured 2:1 layered silicate with nanolayers and galleries between the monolayers wherein:

(i) the homostructured 2:1 layered silicate has cation exchange sites occupied by onium ions and inorganic ions selected from the group consisting of protons, alkali metal and alkaline earth metal ions and mixtures thereof in each of the galleries in a mole ratio of onium ions to inorganic ions between about 10 to 90 and 90 to 10;

(ii) a polymer precursor or polymer melt;

(iii) the silicate layers are separated by the polymer precursor or polymer in the galleries; and (iv) the weight ratio of the polymer precursor or polymer to the layered silicate is between about 1:100 to 100:1, wherein said method comprises:

(a) providing in a mixture the composition with a polymer precursor or polymer melt; and (b) mixing the mixture at a temperature and for a time to produce the cured composite, wherein the galleries contain the polymer.

The present invention provides a useful, low cost mixed organic/inorganic cation exchanged clays by a general method of mixing the organic and inorganic ions over a broad range of relative concentrations. Moreover, the method allows mixing of onium ions with long-alkyl chains with carbon numbers of six or larger. The invention provides a method for preparing homostructured mixed organic/inorganic ion exchanged forms of 2:1 layered silicates that have been previously unknown in the prior art.

The instant invention provides for homostructured mixed organic-inorganic cation exchanged forms of smectite clay and related 2:1 layered silicate compositions. These novel compositions have the organic and inorganic exchange cations distributed sufficiently uniformly within the galleries to form tactoids with uniform intercalation properties. Depending on the specific 2:1 layered silicate, the mixed ion homostructures exhibit at least one X-ray diffraction line with a basal spacing that will depend on the size of the onium ion and the nature of the 2:1 layered silicate. In general, these compositions exhibit a gallery polarity that is intermediate between the parent end members homoionic organic and inorganic clays. Moreover, the polarity can be varied by choice of the relative fractions of organic and inorganic cations that co-occupy the galleries of the homostructure. In general, the organic cation to inorganic cation mole ratio is in the range 10:90 to 90:10, and more preferably in the range 30:70 to 70:30. Consequently, the intercalation properties and, therefore, the performance properties of these compositions or adsorbents, rheological control agents, components for the formation of polymer nanocomposites, and other intercalation-dependent applications, can be controlled by the choice of organic to inorganic ion ratio, the choice of organic and inorganic exchange cations and the choice of the 2:1 layered silicate.

In its preferred embodiments, the inorganic cation is selected from the group comprising alkali metal cations, most preferably $Na^+$, alkaline earth cations, most preferably $Ca^{2+}$, protons (hydronium ions), ammonium ions, and divalent transition metal ions. The organic cations are selected from the group comprising onium ions, most preferably primary, secondary, tertiary and quaternary ammonium ions. Those skilled in the art will know that related onium ions of phosphorous and arsenic are useful replacements for ammonium ions, but these ions are generally less preferred because they are more expensive and toxic. All of the smectite clays are suitable 2:1 layered silicates, as well as those higher charge density analogs that function as cation exchangers. More specifically, the 2:1 layer silicates are selected from the group comprising montmorillonite, hectorite, fluorohectorite, saponite, beidellite, nontronite, stevensite, vermiculite, hydromicas, synthetic smectites, laponite, taneolite, and tetrasilicic mica, and the regularly ordered mixed layered clay rectorite.

Previous art discloses many mixed organic-inorganic exchange ion forms of smectite clays and vermiculite. With one rare exception, namely, the mixed $Cu^{2+}$-short chain alkylammonium ion systems of McBride and Mortland (Clays Clay Minerals 21:323–329 (1973)), all of these compositions represent demixed phase segregated, interstratified, heterostructured or entrapped forms, particularly when the relative fraction of cations exceeds 10:90. Therefore, the homostructured compositions of the instant invention are virtually unknown in the art. The only previously disclosed example of a homostructured mixed ion clay system is limited to the $(CH_3)_4N^+$—$Cu^{2+}$ and $(CH_3)_3NH^+$—$Cu^{2+}$ exchanged forms of montmorillonite (McBride, M. B., et al., Clays Clay Minerals 21:323–329 (1973)). The formation of a homostructure in these $Cu^{2+}$-short chain onium system under ion exchange reaction conditions that ordinarily afford demixed structures most likely arises from the special hydration properties of $Cu^{2+}$ that allow the ion to adopt a hydrated four coordinate square planar geometry compatible with the hydrated forms of short alkyl chain onium ions. For most organic-inorganic ion exchange cations, the hydration properties differ greatly and these differences in hydration energies undoubtedly contribute to the thermodynamically favored demixing of the ions in the layered silicate galleries.

The mixed ion compositions of the instant invention are made to be thermodynamically stable by minimizing differences in the salvation energies of the organic and inorganic exchange cations. A lowering of salvation energy differences can be achieved by replacing the water normally used in the prior art of ion exchange reactions with a water-polar organic solvent mixture. Thus, in one embodiment of the present art a water:ethanol mixture is used to replace the $Na^+$ exchange ions of hectorite. A demixed, phase-segregated structure is initially formed in accordance with the teaching of the prior art. However, the demixed ethanol suspension undergoes ion redistribution reaction in the water:alcohol medium to form stable homostructures upon further reaction for periods of four or more days. This overall conversion can be represented by the reaction sequence:

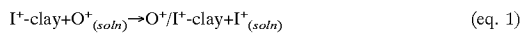

$$I^+\text{-clay} + O^+_{(soln)} \rightarrow O^+/I^+\text{-clay} + I^+_{(soln)} \qquad \text{(eq. 1)}$$

wherein $I^+$ is the inorganic cation and $O^+$ is the organic cation. The $O^+/I^+$-clay initially is a demixed ion structure which is subsequently transformed upon long reaction time to a homostructured clay. Those skilled in the art will know that other polar organic solvents can be used in place of ethanol to stabilize homostructured mixed ion clays. The polar organic solvent component can be selected from the group comprising ethanol, methanol, isopropanol, acetone, acetonitrile, glycol, glycerol and other polyethylene glycols. The water can be replaced in part or in total by the polar organic component, but a mixture with water generally is preferred.

Another very important and greatly preferred embodiment of the instant art is the facile formation of stable homostructured mixed ion clays within minutes at ambient temperature by ion redistribution reaction between homoionic parent end member clays in a suitably polar liquid medium such as a water:ethanol mixture. The highly preferred ion redistribution pathway can be expressed as follows by (eq 2);

$$O^+\text{-clay} + I^+\text{-clay} \rightarrow O^+/I^+\text{-clay} \qquad \text{(eq. 2)}$$

Because the reaction is rapid, usually occurring within minutes at ambient temperature, the redistribution pathway of (eq. 2) is greatly preferred over the ion exchange pathway of eq. 1. The absence of free electrolyte in the reaction medium greatly reduces the time needed for achieving homostructure formation. Also, homoionic $O^+$-clays and $I^+$-clays are easily prepared and are standard items of commerce. Thus homostructured $O^+/I^+$-clays can simply be prepared by mixing the parent end members in an appropriate solvent.

Yet another advantage of the ion redistribution pathway of eq. 2 is that it allows for the facile formation of homostructured forms comprising the layers of two or more different clays. The mixing of layers from two different clays, say clay A and clay B, to form a homostructured product can be illustrated by (eq. 3):

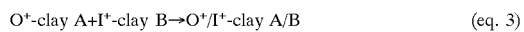

$$O^+\text{-clay A} + I^+\text{-clay B} \rightarrow O^+/I^+\text{-clay A/B} \qquad \text{(eq. 3)}$$

Thus, the redistribution pathway allows for the mixing of clays with different but complementary layer aspect ratios and compositions for improved materials performance. Also, a reduction in the cost of production of homostructured mixed ion clays may be realized by the added flexibility in selecting homoionic parent and members. That is, it may be desirable in some instances for reasons of achieving improved performance or reduced cost to mix an organic vermiculite with an inorganic smectite or to mix the organic and inorganic exchange forms of different smectites (i.e., montmorillonite/laponite) in forming the homostructured mixed ion clay. One skilled in the art may also anticipate mixing layered structures from two very different families, for example an inorganic cation exchanged 2:1 layered silicate and an organic cation exchanged layered sulfide or phosphate.

Those skilled in the art know that X-ray diffraction patterns of powdered or oriented thin film samples are commonly used to describe smectite clays and related 2:1 layered silicates. The diffraction pattern typically provides a measurement of the basal spacing between the stacked layers. Mixed ion systems with phase segregated structures typically exhibit the basal spacings characteristic of the homoionic intercalates that comprises the structure. Entrapped mixed ion systems also may exhibit diffraction peaks corresponding to two basal spacings if the organic and inorganic ions co-occupying the galleries are well segregated within the galleries and if the segregated regions are well stacked one upon the other in the tactoid. Otherwise, only a single basal spacing indicative of the average repeat distance between stacked layers will be observed. Randomly interstratified mixed ion phases typically exhibit one basal spacing that represents the weighted average of the spacings represented by the demixed organic and inorganic galleries contained in the tactoid. Thus, the observed spacing will typically vary within the ratio of organic to inorganic cations in the interstratified structure.

One might expect the basal spacing of a homostructured mixed ion clay to be the same as the spacing found when only the larger cation, typically the organic cation, occupies the gallery. That is, the spacing may not be expected to vary with organic to inorganic cation ratio because the smaller inorganic cations can in principle be accommodated between the larger organic cations. However, composition-invariant basal spacings are seldom the case for homostructured systems because the orientation of the organic cation in the homostructure will vary with the organic cation to inorganic cation ratio. Depending on the space available to the organic ions in the gallery, which in turn will be dependent on the ratio of organic to inorganic ion, the alkyl chains of the onium ion will adopt orientations in which the angle defined by the chain axis and the silicate layer varies from 0° to 90°. Similar chain reorientation also will occur in other mixed ion solids. Also, the charge density on the layers of 2:1 layered silicates can vary within a single tactoid. This charge variation leads to a change in the number and orientation of onium ions from one gallery to the next.

In view of the above considerations, the homostructured mixed ion compositions of the present invention typically exhibit a basal spacing that varies with onium ion to inorganic cation ratio. In this regard the XRD properties of homostructured systems may be similar to and even indistinguishable from those of interstratified systems. However, the homostructured mixed ion clays of the instant invention exhibit novel intercalation properties that makes them valuable materials for adsorption applications, for controlling the rheology of fluids, for the formation of nanostructured composites and other useful applications. Because each of the galleries comprising the tactoids of the homostructured composition of the instant invention contains homogeneously distributed onium ions and inorganic cations, the polarity and hence the intercalation properties of the galleries are similar. Therefore, it is possible to uniformly intercalate essentially all galleries within the tactoids for optimum dispersion in a fluid or polymer or for adsorption of guest molecules within the galleries.

The method uses the restructuring of phase segregated and interstratified mixed ion clays which are converted into homostructured analogs. Another method makes use of solvent compositions that are amphiphilic with regard to solvating both the organic and inorganic exchange cations and facilitating the mixing of the two ions at exchange sites within the same gallery. Thus the present invention uses a method for the preparation of a homostructured mixed organic/inorganic ions layered silicate which comprises:

(a) utilizing direct ion exchange reaction (E) from the layered silicate pristine states, usually containing $Ca^{2+}$ or $Na^+$ ions with desired organic onium ions, and (i) the amount of the desired organic ions is less than the amount needed for a fully exchanged organoclays, ranging from 10% to 90% of the layered silicate cation exchange capacity;

(ii) the reaction is in $H_2O$ or mixed solvent containing $H_2O$;

(iii) the reaction occurs at room temperature or elevated temperatures, which should be below the solvent boiling point; or (b) redistributing (D) the exchange cations of fully exchanged organoclays and inorganic clays, wherein (i) the molar ratios of the organoclay and inorganic clays are in the range of 1:9 to 9:1;

(ii) the reaction is in a mixed solvent, e.g., $H_2O$ and EtOH;

(iii) the reaction occurs at room temperature or elevated temperatures, which should be below the solvent boiling point; or (c) reacting basic organic onium ion precursor with a proton exchanged layered silicate, wherein (i) the proton exchanged layered silicate has at least 10% of its exchange site occupied by protons;

(ii) the amount of the basic onium ion is less than the needed amount for forming a fully exchange organoclay, typically in the range of 10% to 90% by weight;

(iii) the reaction occurs in $H_2O$, or mixed solvents containing $H_2O$;

(iv) the reaction occurs at room temperature or elevated temperatures which should be below the solvent boiling point.

Those skilled in the art of ion exchange know that the ion exchange reactions of turbostratic smectite clays in liquid suspensions normally occur very rapidly (within minutes) at room temperature. Related high charge density 2:1 structures with three-dimensional order such as vermiculite or paragonite, muscovite and other micas are much slower to exchange and may require multiple exchange treatments at elevated temperatures for reaction times of several days. The very fast ion exchange reactions of smectites, as judged from the results of the current art, almost always (with the exception of small organic ion-inorganic ion systems cited above) affords segregated mixed ion forms. Thus one skilled in the art would expect that because the ion exchange kinetics are fast, one should readily achieve the thermodynamically most stable state of the system. Therefore, one skilled in the art would conclude that the ion-segregated phases obtained upon partial replacement of inorganic cations by organic cations in smectite clays represent the most thermodynamically stable states of the compositions. However, the teachings of the instant invention, as demonstrated in the examples below, show that homostructured mixed ion phases can be formed over a broad range of organic ion to inorganic ion ratios.

More specifically, the art of the instant invention also teaches that the segregated, mixed ion exchanged forms of smectite clays can be transformed into the desired homostructured forms by facile, low-cost ion-redistribution reactions at ambient temperature. Furthermore, the redistribution reaction can be used to restructure homoionic end-member organic and inorganic exchange forms of smectite clays into useful homostructured derivations. These redistribution reactions are general, and can be extended to other members of the 2:1 layered silicate family of cation exchanges.

The homostructured organo/inorgano clay can be prepared with direct ion exchange reaction of the inorganic exchange form of the clay with onium ions or redistributing the parent organic and inorganic clays. The inorganic exchange ions include alkali metal cations, alkaline earth cations or protons. The onium ions include primary, secondary, tertiary and quaternary alkyl ammonium, phosphonium and arsonium ions. The said homostructured organo/inorganic clay can be used to prepare polymer-clay nanocomposites. The polymers can be thermosets such as epoxy, polyurethane, polyurea, polysiloxane and alkyds or thermoplastics such as polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactones, polylactides, polyimides, and polyolefins. The said organo/inorganic clays also can be used as sorbents for organic waste removal, rheological additives for paints and as carriers and supports of agents for agriculture applications and chemical catalysis.

There are many families of layered inorganic providing the objects of the present invention. Among the various families described in Tables 1 and 2, the smectite clays are preferred owing to their low cost and availability as natural or synthetic minerals.

Figure 6:
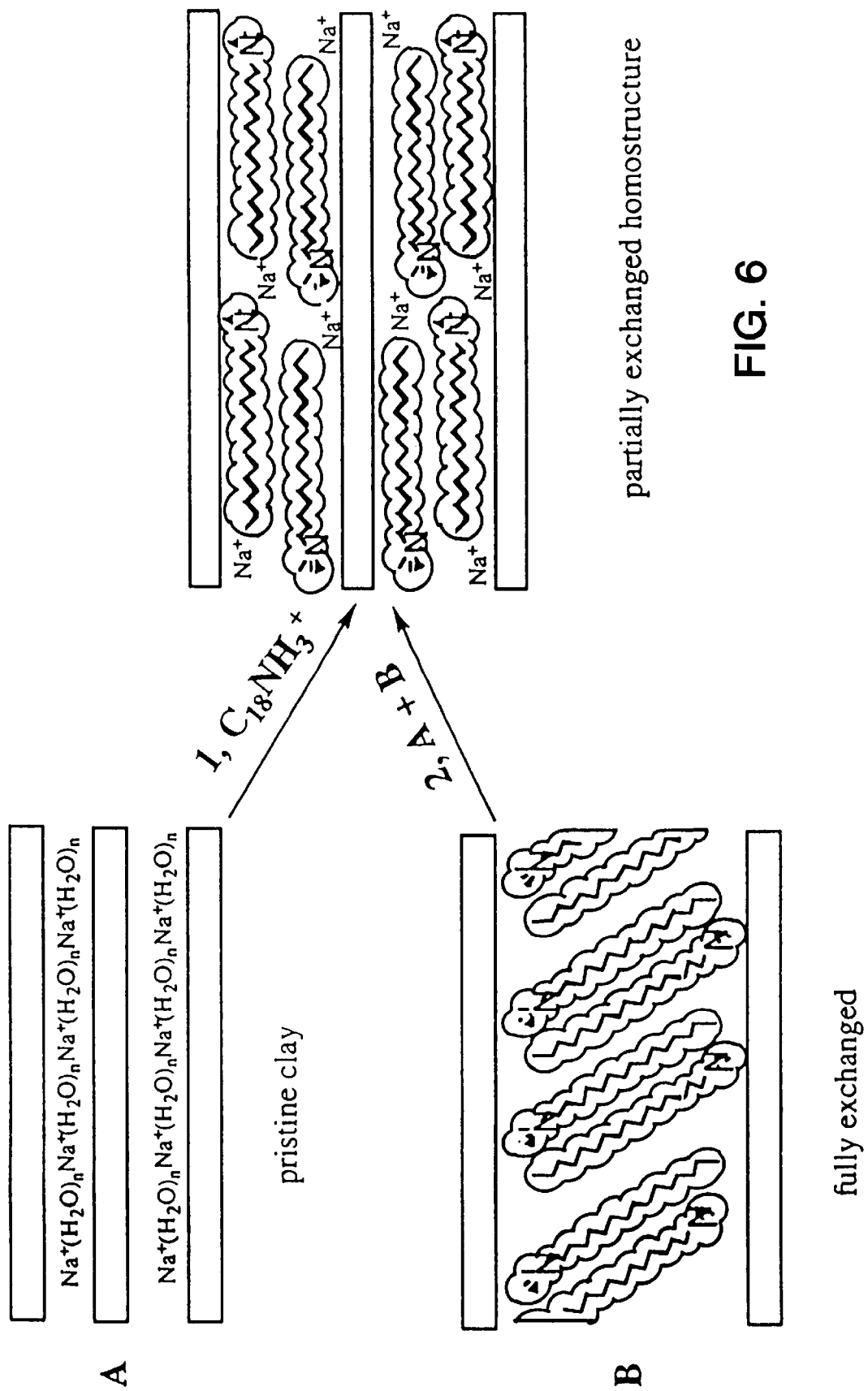
FIG. 6 is a schematic flow diagram showing the preparation of partially exchanged homostructure by (1) direct ion exchange of pristine $Na^+$-clay (A) with an onium ion such as $C_{18}N_{37}NH_3^+$ over a substantial period of time; and (2) a facile redistribution reaction of A with a fully exchanged onium ion Clay (B).

FIG. 6, at "A" illustrates a typical natural smectite clay wherein inorganic exchangeable cation, such as $Na^+$ or $Ca^{2+}$ and coordinated water molecules occupy the interlayer galleries. The other 2:1 layered silicate compositions described in Table 1 possess an analogous structure with exchangeable cations located between the layers that are approximately 1 nm thick. These pristine 2:1 layered silicates are hydrophilic and the galleries generally are not accessible for intercalation of hydrophobic organic monomers and polymers. The pristine silicates normally have a basal spacing in the range of 1.0 to 1.5 nm under ambient condition, depending on the degree of gallery hydration. Cations in the 2:1 layered silicate galleries can be replaced by ion exchange by other positive charged species. Of particular value for the purposes of the art disclosed here are 2:1 layered silicates in which the exchange cations have been partially replaced by protons.

Proton exchanged 2:1 layered silicates are prepared by simple ion-exchange reaction or by thermal conversion of the ammonium exchanged forms of the minerals. Proton exchanged smectite clays and related 2:1 layered silicates typically have basal spacings between 1.0 and 1.5 nm, depending in part on the degree of gallery hydration.

Many polymer polymerizing components contain basic groups. For instance, amines are a widely used class of polymer polymerizing components acting especially as "curing agents" for epoxy resins. The acidic protons in the layered silicate galleries are readily combined with basic groups on this class of polymer polymerizing component. Once the amine is adsorbed partially by the onium exchanged form of the clay, the average separation between the layers increases from 5 Å to 120 Å or beyond, depending on the amount and the size of the adsorbed component. FIG. 5A illustrates the structural features of the curing agent-intercalated silicate concentrate.

The curing agent-intercalated silicate concentrate can react with a mixture of epoxy resin and additional curing agent in stoichiometric amount to form a cured epoxy-nanolayer hybrid composite. In FIG. 5B and 5C, the intercalated curing agent of the concentrate, together with additional curing agent react with the polymer resins to form a cross-linked network in the clay galleries. Ideally, for the preparation of the final hybrid nanocomposite the polymer precursor and the curing agent are mixed in stoichiometric or nearly stoichiometric amounts so that all or nearly all of the polymer precursor has been cross-linked by reaction with the functional groups on the curing agent. When present, the proton acidity of the clay helps in catalyzing the intragallery cross-linking polymerization reaction. In the final hybrid nanocomposite the protons are bound to the basic atoms that are a part of the cross-linked polymer network. In other words, the cured polymer is protonated only to the extent necessary to balance the silicate layer charge.

In order to illustrate the utility of homostructured partially onium exchanged clays for forming layered particulate concentrates and the use of the concentrates in forming cured polymer-inorganic nanolayer hybrid composite compositions, additional descriptions are provided of a cured polymer system, wherein the curing agent is an amine and the resin is an epoxide. However, the invention of polymer polymerizing component-particulate concentrates and the cured polymer-inorganic-organic nanolayer hybrid composites formed from the concentrates is not limited to epoxys only or to 2:1 layered silicates only. The invention is generalized and applied to other thermoset polymer systems, such as polyurethane, polyurea, polysiloxane and alkyds, where polymer curing involves coupling or crosslinking reactions. Also, any of the partially onium ion-exchanged forms of the layered inorganic cation exchange compositions can be used in place of a protonated 2:1 layered silicate.

Further, those skilled in the art of hybrid nanocomposites will know that the disclosed technology also applies to thermoplastic polymer system. For instance, those skilled in the art will know that if the amine groups of an epoxy curing agent lead only to linear chain formation, the cured epoxy matrix will be thermoplastic. For example, the monoamines, and di-secondary amines shown below will form thermoplastic epoxy polymers:

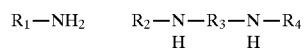

The same principle of formulating and using a polymer polymerizing compound-layered inorganic intercalate concentrate for cured polymer-inorganic nanolayer hybrid formation applies to thermoplastic polymer systems in general. The cured thermoplastic polymer hybrid nanocomposites can be prepared from a polymer polymerizing agent intercalated in a layered inorganic cation exchanger by reaction of the particulate concentrate with an appropriate monomeric reagent. Alternatively, the particulate concentrate may be combined with a polymer melt to form the nanocomposite. In this latter case the process of nanolayer dispersion is equivalent to dispersing the particulate concentrate in a liquid monomer or a mixture of monomer. Coupling of the polymer polymerizing component of the particulate concentrate may occur by reaction with end groups or other reactive centers on the backbone of the molten cured polymer. Alternatively, the polymer polymerizing component and the polymer melt can bind by entanglement. All thermoplastic polymers can benefit from the disclosed technology. The thermoplastic polymers of relevance include polyamides, proteins, polyesters, polyethers, polyurethanes, polysiloxanes, phenol-formaldehydes, urea-formaldehydes, melamine-formaldehydes, celluloses, polysulfides, polyacetals, polyethylene oxides, polycaprolactams, polycaprolactones, polylactides, polyimides, and polyolefins (vinyl-containing thermoplastics).

It is important to emphasize that the particulate concentrate compositions can be formed from any polymer-polymerizing component with the layered inorganic cation exchange composition. For instance, in the case of an amine-clay concentrate for preparation of a cured epoxy-layered silicate hybrid nanocomposite, the layered particulate concentrate is made by intercalating the inorganic phase with an amino-functional reagent, which is termed a "curing agent" by those skilled in the art, or, more generally for the purpose of the present invention, a "polymer polymerizing component". However, a particulate concentrate composition useful for forming cured epoxy nanocomposites can alternatively be formed by reaction of the epoxy resin with the partially onium ion exchanged clay. In this case, the intercalated epoxy resin functions as the polymer polymerizing agent. But, in this case care is needed in selecting the processing conditions so that epoxide ring opening and self-polymerization reactions are avoided.

Thus, the concept of forming a layered particulate concentrate for the preparation of thermoset polymer-inorganic nanolayer hybrid composites is a general one and can be applied to many thermoset polymer systems other than epoxides. For instance, silicone elastomers are generally formed by the reaction of siloxane oligomers with silicon alkoxide crosslinking agents. A typical cured polymer system is illustrated as follows:

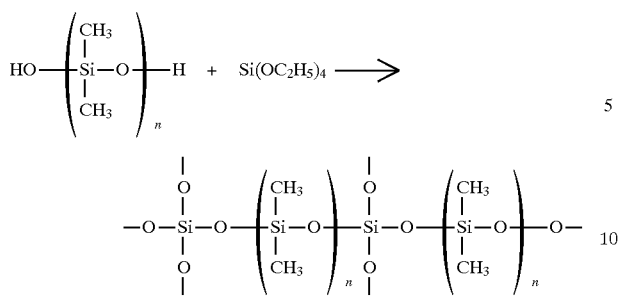

According to the teaching of the present invention, siloxane elastomer-inorganic nanolayer composite can be formed from an intercalated particulate concentrate containing a siloxane polymerizing component and subsequently mixing the concentrate with the necessary amounts of polymer precursor

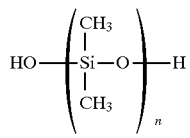

under the conditions necessary for curing the polymer. Examples of suitable siloxane polymer polymerizing component are those containing an amino group, such as: $H_2N(CH_2)_3Si(OR)_3$, where R is an alkyl group, or $H_2N(CH_2)_3HN(CH_2)_3Si(OR)_3$, and many others that are readily available on a commercial basis (e.g., see Gelest Inc. Catalog (1996), Tullytown, Pa.).

Furthermore, polyurethane polymers are prepared by reaction of isocyanate and polyols:

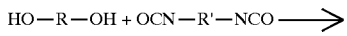

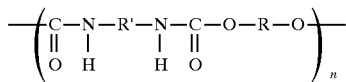

The concentrates are used to react with appropriate amounts of polyols and isocyanate under conditions necessary to form cured polyurethane-inorganic nanolayer hybrid nanocomposites.

Furthermore, alkyd polymer matrices, formed as illustrated in the following systems are adaptable to the teachings of this invention for formation of hybrid nanocomposites. Glycerol can be intercalated partially onium ion exchanged inorganic cation exchangers, and the resulting concentrates are suitable for nanolayer composite formation.

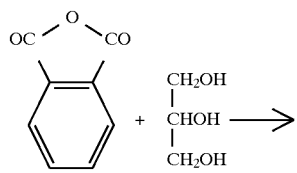

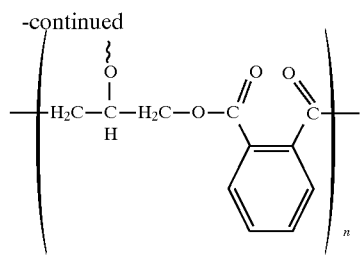

As stated earlier, the present invention relates in part to polymer precursor-2:1 layered silicate intercalate concentrate compositions and methods to prepare them. The silicates mineral should have certain ion exchange properties as in smectite clays, rectorite, vermiculite, illite, micas and their synthetic analogs, including laponite, synthetic mica-montmorillonite and tetrasilicic mica. The silicate layers in the concentrate composition have an average diameter of between about 200 and 20,000 Å and a ratio of diameter to thickness of the particles in a range between about 2000 and 20 to 1.

The layered inorganic cation exchange composition of this invention are prepared by ion exchange reaction with suitable salt solutions (e.g. NaCl or $CaCl_2$). The proton exchanged forms may be prepared by any of several possible methods, including direct ion exchange with a mineral acid, ion exchange with the proton exchange form of an ion exchange resin such as Dowex or Amberlite resins, or by thermal decomposition of the ammonium form. Typically at least 10% of the exchange sites are occupied by protons, and all of the silicate exchange sites not occupied by an onium ion can be protonated.

The intercalation of a basic polymer polymerizing component into the protonated mixed ion clay can be achieved by using solvent and solvent-free processes. In the solvent-based process, the polymer polymerizing component is placed in a solvent that is inert toward polymerization or coupling reaction. For a polyetheramine, for example, the intercalation can be carried out in single or mixed solvent system. Particularly suitable solvents are water or water-ethanol, water-acetone and like water-polar co-solvent systems. Upon removal of the solvent, the intercalated particulate concentrates are obtained. In the solvent-free process, a high shear blender is usually required to conduct the intercalation reaction. The said polymer polymerizing component-particulate intercalate concentrates may be in a suspension, gel, paste or solid forms.

In thermoset polymer processing one of the reagents is typically referred to as the curing agent and the epoxide-functional component is call the "resin" or "polymer" precursor. In the formation of epoxy thermoset polymers, for example, the epoxide reagent is typically referred to the resin precursor and the crosslinking agent, typically an amine, is termed the curing agent. When the present invention is applied to an epoxy polymer system, or to a related thermoset polymer matrix, the polymer polymerizing component of the layered particulate concentrate requires functional crosslinking groups for curing the polymer resin or precursor. Amine groups are preferred basic groups they are capable of crosslinking certain resins, (especially epoxy) to form a cured polymer. The polymer polymerizing component can have other functional groups for coupling or crosslinking reactions, for example, an acid anhydride and/or an amide group in the case of curing an epoxy polymer.

The preferred partially onium ion exchanged forms of the 2:1 layered silicates embodied by this invention include naturally occurring and synthetic forms of smectites with layer charge densities of 0.4–1.4 $e^-/O_{20}$ unit, such as montmorillonite, hectorite, saponite, nontronite, beidellite, fluorohectorite, and laponite, and mixed layered 2:1 silicates such as rectorite, synthetic mica montmorillonite, and illite and vermiculite and mica-like compositions containing up to 2.0 $e^-/O_{20}$ unit cell such as muscovite, biotite, phlogopite, synthetic mica montmorillonite, taeniolite, and tetrasilicic mica. The silicate layers have a particle size between about 200 and 200,000 Å and a ratio of diameter to thickness in a range between about 20,000 to 1 and 20 to 1. The broad range of particle sizes, ion exchange capacities and the low cost of these layered inorganic ion exchangers are highly preferred.

The proton exchanged 2:1 layered silicates can be prepared by several different routes but the following three general methods are most preferred. The partially onium ion exchanged silicates prepared from the said three methods exhibit identical powder X-ray diffraction patterns, and are equally well suited for forming intercalated polymer polymerizing component-layered particulate concentrated. The partially onium ion exchanged layered silicates retain their platy morphology. The proton-containing gallery regions of the homostructure are sufficiently expanded and readily take up guest molecules. The 2:1 layered silicate partially onium ion exchanged for the formation of useful particulate concentrate compositions, but at least 10% by number of the cation exchange sites of the mineral should be replaced by onium ions.

Polyetheramines or polyamides used in the present invention as examples of epoxy polymerizing components are soluble in $H_2O$ or in $H_2O$/ethanol mixed solvents. The addition of a polyetheramine or polyamide to partially onium ion-exchanged layered silicate homostructure in $H_2O$ or $H_2O$/EtOH suspension, and the polyetheramine or polyamide guest molecules are readily intercalated in the galleries between the layered silicate nanolayers. A typical polyetheramine such as JEFFAMINE D2000 (Huntsman Chemicals, Houston, Tex.), when intercalated into a homostructured onium ion-proton exchanged-montmorillonite, gives rise to a basal spacing of 45 Å. In the solvent-free process, the dried homostructured clays and the polyetheramine or amide are mixed in a blender (e.g., Waring Commercial Blender) and blended at high speed. The mixing at the solid-liquid interface results in the intercalation of the polymer precursor into the silicate galleries. By adjusting the weight ratio of the curing agent and the silicate, one can control the morphology of the polymer polymerizing component-layered silicate intercalate concentrate to obtain a powder, paste or gel. The weight ratio of amine curing agent to smectite is in the range of 1:100 to 200:1, and more preferably 1:5 to 20:1. The choice of the concentrate in powdered, gel, or liquid suspension form depends on the preferred conditions for processing the cured nanocomposite, particularly on the desired loading of the layered silicate in the cured composites. For example, the powdered form of the concentrate allows maximum loading of silicate in the final cured nanocomposite. But if a low silicate loading is desired, it is more convenient to form the cured composite from the concentrate in liquid form.

The powdered, gel-like or suspension forms of the inorganic particulate concentrates all are useful for forming cured polymer-inorganic nanolayer hybrid composites. The powdered forms are higher in inorganic content and can be used to form cured polymer-nanolayer hybrid composites with proportionately higher final reinforcement properties. The gel and suspension forms of the particular concentrates are convenient for forming nanolayer composites with lower inorganic content for use as coatings and films.

The polymer composites of this invention are distinguishable from composites made from fully alkylammonium exchange forms of 2:1 layered silicates in three important ways: (1) the initial silicate has reduced alkylammonium exchange ions that can interfere with favorable binding interaction between the polymer and the silicate surface and (2) the composites exhibit tensile strength and modulus substantially better than composites made from fully alkylammonium exchanged clays and (3) the hybrid composites prepared from proton exchanged 2:1 layered silicates are more resistant to swelling by organic solvents.

The separation between the nanolayers in the cured polymer composites can be ordered or disordered with regard to their ability to exhibit X-ray diffraction patterns. If the nanolayer separation is ordered (FIG. 5B) with a regular separation between layers, one or more 001 Bragg XRD reflection is observed. If the nanolayer separation is disordered (FIG. 5C), i.e., highly variable, then the Bragg scattering is very broad, and in most cases unobservable by routine XRD techniques. In general, the cured polymer-nanolayer hybrid composites of the present invention are of the disordered type.

The nanocomposite compositions of this invention are resistant to swelling and degradation by organic solvents. Pristine cured -polymers and conventional composite are readily swollen upon submersion in organic aromatic and aliphatic solvents, like toluene and hexane. Upon evaporation of the solvent the polymer matrix often disintegrates and forms cracks and crevices that greatly weaken the material. However, the cured polymer nanolayer hybrid composites of the present invention typically resist swelling by organic solvents and are restored to their original form upon the evaporation of solvents.

Epoxy resins:

Epoxy resins are especially suitable for illustrating the general teachings and versatility of this invention in providing for useful hybrid nanocomposite compositions and merit special description as provided below.

The epoxy resins are well known to those skilled in the art and are described in Kirk-Othmer, John Wiley & Sons, 9 267–290 (1980). They are available from a variety of commercial sources including Shell Co., Ciba, and The Dow Chemical.

Bisphenol A type EPON-828 (Shell Co., Houston, Tex.), is an epoxy resin precursor with the bisphenol A structure and a molecular weight of 380, and has the formula:

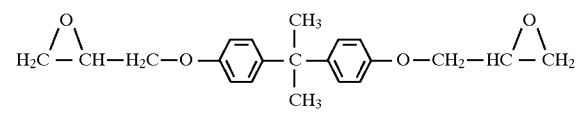

Bisphenol-A type, DER 331 (Dow Chemical Co., Midland, Mich.), is an epoxy polymer precursor and is an analog to Epon-828 having the formula:

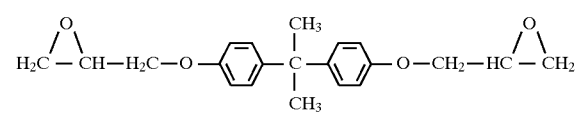

Bisphenol-F type, DER 354 (Dow Chemical Co.) is an epoxy polymer precursor having the formula:

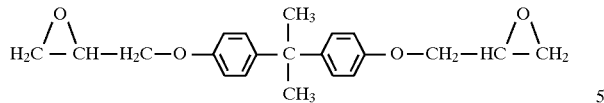

Novolac type, DER 435, DER 438 and DER 439 (Dow Chemical Co.) are epoxy polymer precursors having the formula:

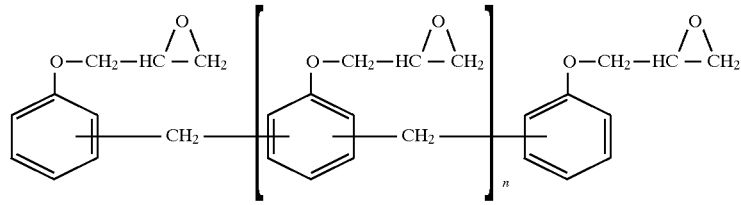

wherein n is between about 0.2 and 1.8.

Epoxy polymer, DER 732 (Dow Chemical Co.) is an epoxy resin precursor of the general formula:

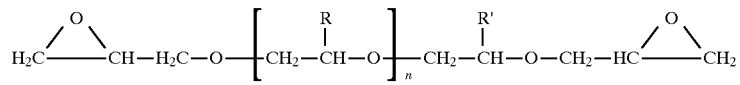

Epoxypropoxypropyl terminated polydimethylsiloxanes:

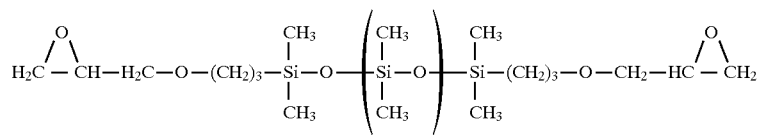

There are numerous other types of epoxy polymer precursors which are suitable and which are well known to those skilled in the art.

Epoxy curing agents:

Amine curing agents are used to cure the epoxy resin precursors into an epoxy resin. The most preferred curing agents are polyoxypropylene di- or triamines which are sold as JEFFAMINE, Huntsman Chemical Company, Austin, Tex. Most preferred are the polyoxypropylene diamines (D-series) of the formula:

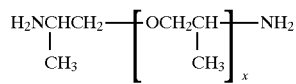

wherein x is between about 4 and 40.

The preferred diamines when used as curing agents for the epoxy resin precursors produce a glass transition temperature of less than ambient temperatures (25° C.) and preferably less than 0° C. As a result, when cured to a pristine epoxy resin without any filler, the resins are flexible when x is between about 4 and 40 in the polyoxypropylene diamine, the cured epoxy resin is also elastic.

The T series JEFFAMINE can be used. These are $$CH_3-CH_2-\underset{\underset{CH_2-[O-CH_2CH(CH_3)]_z-NH_2}{|}}{\overset{\overset{CH_2-[O-CH_2CH(CH_3)]_x-NH_2}{|}}{C}}-CH_2-[O-CH_2CH(CH_3)]_y-NH_2$$

wherein x+y+z between about 4 and 120.

Various other epoxy resin curing agents, such as anhydrides and amides, can be used, so long as they do not interfere with the curing action of the primary ammonium cations in the clay. The amide curing agents are for instance

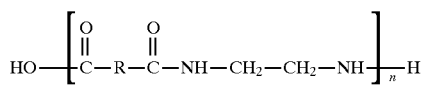

where n is between about 5 and 15.

Aminopropyl terminated polydimethylsiloxanes are suitable to crosslink epoxypropoxypropyl terminated polydimethylsiloxanes to make silicone rubber.

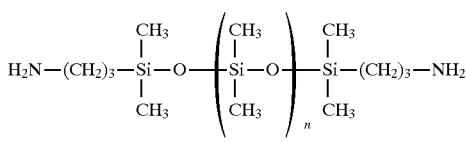

The final composite may be prepared from a single curing agent composition or from a multiple curing agent composition. The concentrate contains polymer precursors that are same as or different from those cured for preparing the final nanocomposite compositions.

When the polymer matrices in the hybrid nanocomposites of the present invention are flexible, they are very strong in comparison to the pristine polymer. The flexible composites of the present invention are particularly useful as sealants and flexible adhesives. They are strong, exhibiting a relatively high tensile strength. The compositions of the present invention can be used for: surface coatings, particularly decorative coatings; protective coatings; casting and encapsulation; construction, particularly seamless floors, sand-filled flooring, decorative aggregate, polymer concrete, trowel coatings, and wood consolidation; reinforced composites, particularly for propeller and impeller blades, boats, filament-wound tanks and piping; and adhesives. Other uses where a relatively thin flexible layer is needed are for instance in the dampening of interfaces between vibrating surfaces.

The polymer polymerizing component-layered ion exchange concentrate compositions described in this invention can be processed by already developed composite fabrication techniques, including casting and injection methods. For slow curing thermoset systems, e.g., epoxy and polysiloxane, several cast molding methods are very convenient; and for fast curing thermoset systems, e.g., alkyd and polyurethane, injection transferring method are suitable. The hybrid nanocomposites described in this invention not only can be used as end-use materials, but also, can be used as polymer matrix for fiber-reinforced composite materials. Further introduction of various fibers to the silicate nanolayer-reinforced polymer matrices will provide multi-component composite materials.

The following are non-limiting examples of the present invention.

EXAMPLE 1

Example 1 demonstrates the preparation of a fully exchanged onium ion clay using a primary alkylammonium ion.

The cation exchange reaction was carried out by mixing 500 ml of 0.05M $CH_3(CH_2)_{17}NH_3^+$, (abbreviated 18A) as chloride salt in ethanol:water (1:1) solution and 2.0 g of HECTABRITE AW a commercial hectorite supplied by Amcol International, (2 wt % water slurry) at 70°–75° C. for 24 hours. The mixing was accomplished by adding the alkylammonium ethanol/$H_2O$ solution to the clay water suspension stirred by a magnetic stirrer. The amount of the alkylammonium ion needed to achieve a fully exchanged clay was 2.8 mmoles. The actual amount of the alkylammonium ion used in the reaction was 25 mmoles in the solution. Therefore, the alkylammonium ion was present in 9-fold excess. The exchanged clay was washed with ethanol:water (1:1) several times until no chloride was detected with 1.0M $AgNO_3$ solution and then air dried. Finally, the clay was ground and the fraction with an aggregated particle size of 40–50 μm was collected. The fully exchanged 18A-HECTABRITE AW (E1) exhibited a basal spacing of 31.2 Å as judged from XRD (FIG. 2B), whereas air dried Na-HECTABRITE gave a XRD peak at 12.6Å (FIG. 2A). The same basal spacing of 31.2Å was obtained for a sample prepared from a 18Å solution containing even a 20-fold excess of the onium ions.

EXAMPLE 2

Example 2 demonstrates the preparation of a smectite clay in which the inorganic exchange cation is partially exchanged by organic onium ions to give tactoids containing segregated inorganic and organic ion exchanged clay phases.

A 2-g quantity of Na-HECTABRITE AW was added to 500 ml of 0.003M alkylammonium ($CH_3(CH_2)_{17}NH_3^+$, 18A) chloride ethanol:water (1:1 v/v) solution and 2.0 g of clay (2 wt % of water suspension) at 70°–75° C. for 24 hours on a magnetic stirrer. The amount of the alkylammonium ion needed for a fully exchanged organoclay is 2.8 mmoles. Because the replacement of $Na^+$ ion by onium ions is nearly quantitative, the ratio of organic onium ion to inorganic exchange cation in the product is near 0.54:0.46 or approximately 1:1. The exchanged clay was washed with 1:1 (v/v) ethanol:water several times until no chloride was detected with 1.0M $AgNO_3$ solution and then air dried. Finally, the clay was ground and the aggregated particle size fraction of 40–50 μm was collected. As shown by the XRD pattern in FIG. 2D, the final clay (E2) exhibited basal spacings of 31.2 Å and 12.6 Å. The 31.2 Å peak represented a fully exchanged organoclay phase and the 12.6 Å peak represented the pristine inorganic sodium clay. E2 had a partially (50%) exchanged organoclay composition, but contained two clay phases.

EXAMPLE 3

Example 3 demonstrates the preparation of a homostructured mixed onium ion-inorganic ion exchanged form of a smectite clay by partial ion exchange reaction of the pristine inorganic clay.

A 2-g quantity of Na-HECTABRITE AW was added to 500 ml of 0.003M alkylammonium ($CH_3(CH_2)_{17}NH_3^+$, (abbreviated 18A) as a chloride salt in 1:1 (v/v) ethanol:water solution and 2.0 g of clay (2 wt % of water slurry) at 70°–75° for at least 96 hours. The amount of the alkylammonium ion needed to obtain a fully exchanged clay was 2.8 mmoles. Because the replacement of $Na^+$ ion by onium ions is nearly quantitative, the ratio of organic onium ion to inorganic exchanged in the product is near 0.54:0.46 or approximately 1:1. The exchanged clays were washed with 1:1 (v/v) ethanol:water several times until no chloride was detected with 1.0M $AgNO_3$ solution and then air dried. Finally, the clay was ground and the aggregated particle size fraction of 40–50 μm was collected. As shown in FIG. 2C, the final clay (E3) had a basal spacing of 18.5Å.

The product of Example 3 was denoted as 18A-HECTABRITE AW-50%-E, where 18A designates the onium ion, HECTABRITE AW is the clay, 50% represents the percentage of onium ion on the exchange sites and E indicates the sample was prepared by conventional exchange reaction.

EXAMPLES 4 AND 5

Homostructured samples E4 (18A-HECTABRITE AW-30%-E) and E5 (18A-HECTABRITE AW-70%-E) were prepared by using reaction conditions analogous to E3 except that the amount of 18A onium ion in the exchange reaction corresponded to 30% and 70% of the ion exchanged capacity of the clay, respectively. E4 exhibited a single XRD diffraction at 16.5 Å and E5 gave a single XRD peak at 22.0 Å. They are both homostructured organic-inorganic mixed ion clays.

EXAMPLE 6

Example 6 demonstrates the preparation of homostructured organic-inorganic ion exchanged clays by using a redistribution reaction of the completely exchanged inorganic and organic parent end member clays. The parent end members have all of the cation exchange sites occupied exclusively by organic or inorganic cations.

A 2-g quantity of E1 (18A-HECTABRITE AW-100%-E) was dispersed in a 100 ml of ethanol:water (1:1 v/v) mixed solvent. A 1.6 g quantity of the pristine Na$^+$-HECTABRITE AW was dispersed in 50 ml water. The above two clay suspensions were mixed and stirred on a magnetic stirrer at 25° C. for a period of time, typically 5 min, followed by removal of the solvent and then air dried. The resulting clay exhibited a single XRD peak of 18.5 Å. E6 was denoted as 18A-HECTABRITE AW-50%-D, where D represents the redistribution reaction.

EXAMPLES 7 AND 8

Examples 7 and 8 further demonstrate the preparation of homostructured mixed organic-inorganic clays by using a redistribution reaction of homoionic 18A- and Na$^+$-exchanged parent clay end members.

Samples E7 and E8 were prepared by redistribution reactions of 30:70 and 70:30 molar ratios of parent 18A and Na$^+$-exchanged end members. The reaction conditions were essentially the same as those described for E6. Sample E7, 18A-HECTABRITE AW-30%-D and sample E8, 18A-HECTABRITE AW-70%-D gave a basal spacing of 16.5 Å and 22.0 Å, respectively.

EXAMPLES 9–14

Examples 9–14 illustrate the formation of homostructured mixed organic-inorganic ion clays by redistribution reaction of Na$^+$ clay and primary alkylammonium clay with carbon chain lengths of 8 carbon atoms (designated 8A) and 12 carbon atoms (designated 12A). The reaction conditions were equivalent to those used in Example E6. The gallery cation composition and clay basal spacing are listed in Table 3. E9 was denoted 12A-HECTABRITE AW-30%-D; E10, 12A-HECTABRITE AW-50-D; and E11, 12A-HECTABRITE AW-70-D. E12 was denoted 8A-HECTABRITE AW-30-D; E13, 8A-HECTABRITE AW-50-D; and E14 8A-HECTABRITE AW-70D. Table 3. Basal Spacings (Å) of Homostructured Mixed Organic-Inorganic Ion Exchanged Forms of nA$^+$-Na$^+$-HECTABRITE AW Clays Prepared by Redistribution Reaction of the Parent End Member Clays.

|  | Na$^+$/nA$^+$ Ratio | | | | |
|---|---|---|---|---|---|
| Onium Ion | 1:0 | 1:1 | 3:7 | 7:3 | 0:1 |
| 18A$^+$ | Na-Hect | E6 | E7 | E8 | E1 |
| d001,(Å) | 12.6 | 18.5 | 16.5 | 22.0 | 31.2 |
| 8A$^+$ | Na-Hect | E10 | E9 | E11 | 8A-Hect* |
| d001,(Å) | 12.6 | 15.5 | 15.2 | 20.1 | 21.0 |
| 12A$^+$ | Na-Hect | E13 | E12 | E14 | 12A-Hect* |
| d001,(Å) | 12.6 | 16.4 | 15.6 | 18.9 | 24.0 |

*8A-Hect and 12A-Hect represent 8A and 12A fully exchanged HECTABRITE AW clays.

EXAMPLES 15–16

Examples 15–16 illustrate the formation of homostructured organic-inorganic ion exchanged clays where the organic cation is a quaternary alkylammonium ion. The representative quaternary alkylammonium ion was CH$_3$(CH$_2$)$_{15}$N(CH$_3$)$_3^+$, denoted henceforth as 16A3M$^+$.

For the preparation of sample E15, a cation exchange reaction was carried out by mixing 500 ml of 0.003M CH$_3$(CH$_2$)$_{15}$N(CH$_3$)$_3$ chloride salt in 1:1 (v/v) ethanol:water solution and 2.0 g of Na-HECTABRITE AW clay (2 wt % water slurry) at 70°–75° C. for 96 hours. The amount of the alkylammonium ion needed for a fully exchanged clay was 2.8 mmoles. The amount of the alkylammonium ion used in the reaction was 1.5 mmoles. Therefore, the molar ratio of the quaternary alkylammonium ion to Na$^+$ ions in the final product was near 1:1. The exchanged clay was washed with 1:1 (v/v) ethanol:water several times until no chloride was detected with 1.0M AgNO$_3$ solution and then air dried. Finally, the clay was ground and the aggregated particle size fraction of 40–50 μm was collected. The E15 product, 16A3M-HECTABRITE AW-50%-E exhibited an XRD basal spacing of 19Å. A fully exchanged, 16A3M-HECTABRITE AW prepared by the method of Example 1 had a basal spacing of 24.4Å.

In the preparation of sample E16 a redistribution reaction of the parent clays was used.

A 2-g quantity of fully exchanged 16A3M-HECTABRITE AW, (d$_{001}$=24.4Å) was dispersed in 100 ml of 1:1 (v/v) ethanol:water mixed solvent. A 1.6 g quantity of the pristine Na$^+$-HECTABRITE AW was dispersed into 50 ml of water. The above two clay suspensions were mixed and stirred at 75° C. for a period of time, typically, 5 min. Followed by removal of the solvent, the product was air dried. The resulting clay had a single XRD peak at 19Å. E16 is a homostructured organic-inorganic ion exchanged clay prepared by gallery cation redistribution reaction. The E16 product was denoted as 16A3M-HECTABRITE AW-50%-D, where D represents the redistribution reaction.

Based on the XRD results, 16A3M-HECTABRITE AW-50%-E and 16A3M-HECTABRITE AW-50%-D had identical basal spacing. Also, TGA analysis data show that they have identical organic compositions. Thus, the same homostructured organic-inorganic mixed ion clay containing quaternary alkylammonium ions can be prepared by ion exchange and redistribution reactions.

EXAMPLES 17–19

Examples 17–19 illustrate the usefulness of homostructured organic-inorganic mixed ion clays as reagents for the formation of reinforced organic polymer-clay nanocomposites. The polymer matrix selected as an example was a cured epoxy.

A pristine epoxy polymer with a sub-ambient glass transition temperature was prepared by crosslinking EPON-828 epoxy resin (Shell) and JEFFAMINE D2000 (Huntsman Chemicals) polyetheramine curing agent. Equivalent amounts of the epoxide resin (27.5 wt %) and the polyetheramine (72.5 wt %) were mixed at 75° C. for 30 minutes. The epoxide-amine complex was then outgassed in vacuum for 10 minutes and transferred into an aluminum mold for curing at 75° C. for 3 hours and then at 125° C. for an additional 3 hours. The pristine epoxy matrix had a tensile strength of 0.6 MPa and a tensile modulus of 2.8 MPa. This pristine polymer sample served as a comparative example.

Sample E17, a conventional clay-epoxy composite was prepared from naturally occurring Na$^+$-HECTABRITE AW. The Na$^+$-HECTABRITE AW was purified and the portion with an aggregated particle size of 40–50 μm was used for dispersion in the composite. 10 wt % of the Na-HECTABRITE AW was added to the EPON 828-D2000 mixture and stirred for 30 minutes. This mixture and like mixtures of homostructured mixed ion clays and epoxy resin represented a clay concentrate useful for forming conventional composite compositions. The preparation method for forming an epoxy composite was essentially the same as the method used to prepare the pristine matrix. The composite containing 10 wt % Na$^+$-HECTABRITE AW was a phase-segregated composite with no intercalation occurring in the gallery regions occupied by Na$^+$ ions. Tensile strength and modulus of the composite were 1.3 and 3.2 MPas, respectively. The phase segregation of the clay in the polymer matrix indicated little interaction between the inorganic clay and the polymer matrix. XRD analysis shows that the clay retained its basal spacing after composite formation, verifying the absence of polymer intercalation in the clay.

An intercalated clay-epoxy composite sample E18 was prepared from 16A3M-HECTABRITE AW-50%-D. 10 wt % of the 16A3M-HECTABRITE AW-50%-D was added to an EPON 828-D2000 mixture and stirred for 30 minutes. This mixture and like mixtures of homostructured mixed ion clay and epoxy resin represented a clay concentrate useful for forming nanocomposite compositions. The composite preparation method was essentially the same as the preparation of the pristine matrix. The composite containing 10 wt % 16A3M-HECTABRITE AW-50%-D was an intercalated nanocomposite. XRD analysis showed that the intercalated clay in the matrix had a basal spacing of 38Å. Tensile strength and modulus of the composite were 2.6 and 6.8 MPa, respectively.

Figure 3:
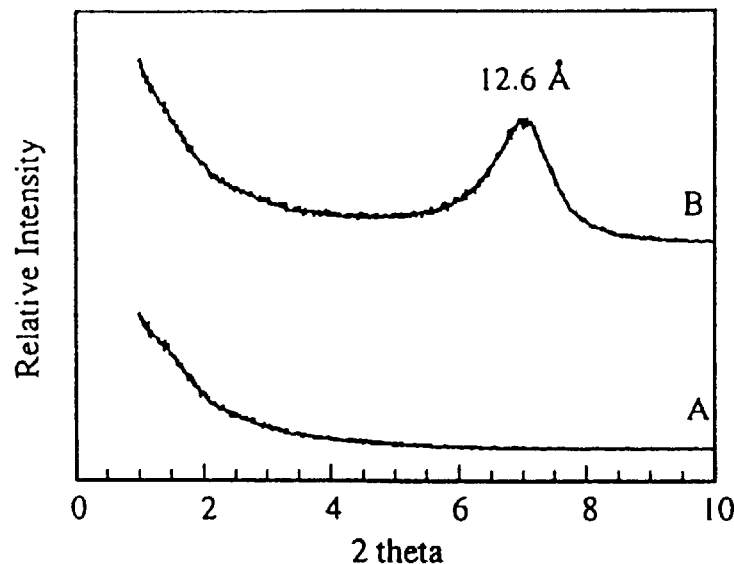
FIG. 3 is a graph of XRD patterns (Cu—$K_\alpha$) for epoxy-clay composites containing (A) 10 wt % homostructured 18A/Na-HECTABRITE AW, and (B) 10 wt % phase segregated 18A-HECTABRITE AW (50 wt %) and Na-HECTABRITE AW (50 wt %). For both systems the molar ratio of 18A onium ion to $Na^+$ is approximately 1:1 (Examples 17 to 19).

An exfoliated clay-epoxy composite sample E19 was prepared from 18A-HECTABRITE AW-50%-D as evidenced by XRD diffraction pattern in FIG. 3A. 10 wt % of the 18A-HECTABRITE AW-50%-D was added to EPON 828-D2000 mixture and stirred for 30 minutes. The composition preparation method was essentially the same as that used for the preparation of the pristine matrix. XRD analysis shows that no clay $d_{001}$ diffraction peaks. Therefore, the composite containing 10 wt % 18A-HECTABRITE AW-50%-D was an exfoliated nanocomposite. The tensile strength and modulus of the composite were 3.8 and 16 MPa, respectively. Composite prepared from phase segregated clay (E2) exhibited diffraction at 12.6 Å (FIG. 3B) and was a mixture of conventional and exfoliated composite.

Additional mechanical data for different epoxy-clay composites material are listed in Table 4. The most significant reinforcing effect was consistently observed from the exfoliated clays. Most importantly, the homostructured organic-inorganic mixed ion clays were comparable to fully exchanged homoionic organic onium ion clays in providing tensile reinforcement of the polymer matrix.

TABLE 4

A comparison of Tensile properties for various types of epoxy resin-clay composite compositions formed from homoionic and mixed ion HECTABRITE AW. All composites contained 10 wt % clay.

| Clays | Composite Type | Tensile Strength (MPa) | Tensile Modulus (MPa) |
|---|---|---|---|
| No clay | na | 0.6 | 2.8 |
| Na$^+$-HECTABRITE AW | Conventional | 1.3 | 3.2 |
| 8A-HECTABRITE AW-30%-E | Conventional | 1.4 | 3.5 |
| 8A-HECTABRITE AW-30%-D | Conventional | 1.4 | 3.4 |
| 8A-HECTABRITE AW-50%-E | Intercalated | 2.3 | 5.9 |
| 8A-HECTABRITE AW-50%-D | Intercalated | 2.3 | 6.3 |
| 8A-HECTABRITE AW-70%-E | Exfoliated | 3.6 | 8.4 |
| 8A-HECTABRITE AW-70%-D | Exfoliated | 3.7 | 7.9 |
| 18A-HECTABRITE AW-30%-E | Exfoliated | 3.2 | 8.9 |
| 18A-HECTABRITE AW-30%-D | Exfoliated | 3.3 | 8.7 |
| 18A-HECTABRITE AW-50%-E | Exfoliated | 3.8 | 16.0 |
| 18A-HECTABRITE AW-50%-D | Exfoliated | 3.9 | 15.3 |
| 18A-HECTABRITE AW-70%-E | Exfoliated | 3.9 | 15.8 |

TABLE 4-continued

A comparison of Tensile properties for various types of epoxy resin-clay composite compositions formed from homoionic and mixed ion HECTABRITE AW. All composites contained 10 wt % clay.

| Clays | Composite Type | Tensile Strength (MPa) | Tensile Modulus (MPa) |
|---|---|---|---|
| 18A-HECTABRITE AW-70%-D | Exfoliated | 3.7 | 16.2 |
| 18-montmorillonite-100%-E | Exfoliated | 3.6 | 14.5 |
| 18A3M-montmorillonite-100%-E | Intercalated | 2.6 | 12.4 |
| 16A3M-HECTABRITE AW-30%-E | Intercalated | 2.3 | 6.9 |
| 16A3M-HECTABRITE AW-30%-D | Intercalated | 2.6 | 7.0 |
| 16A3M-HECTABRITE AW-50%-E | Intercalated | 2.5 | 6.8 |
| 16A3M-HECTABRITE AW-50%-D | Intercalated | 2.4 | 7.2 |
| 16A3M-HECTABRITE AW-70%-E | Intercalated | 2.5 | 7.9 |
| 16A3M-HECTABRITE AW-70%-D | Intercalated | 2.6 | 7.6 |

EXAMPLE 20

Example E20 demonstrated the reaction properties of phase segregated organic-inorganic clay (E2) in the epoxy-clay nanocomposite formation process.

A clay-epoxy composite composition (E20) was prepared from E2 which has a mixed phase of 18A-HECTABRITE AW and Na-HECTABRITE AW. XRD pattern of the clay sample (E2) indicated two distinct phases, 31.2 Å and 12.6 Å. The preparation method for forming an epoxy composite was essentially the same as the preparation used to prepare the pristine matrix. The composite containing 10 wt % E2 was a phase-segregated composite. The 31.2 Å basal spacing was not observable after the composite formation, but the 12.6 Å basal spacing remained. This indicated that the organoclay phase (31.2 Å) was exfoliated and the inorganic phase retained its original basal spacing of 12.6 Å. The distribution of the silicate in the final composite was not uniform, as the inorganic phase settled down to the bottom of the sample in the composite formation process. Tensile strength and modulus of the composite were 1.9 and 6.9 MPa, respectively.

EXAMPLES 21–22

Examples 21 and 22 demonstrate the formation of homostructured organic-inorganic mixed ion clays from alkylammonium ions and inorganic cations, other than alkali metal cation, such as hydronium (hydrated proton, $H_3O^+$) and $Ca^{2+}$ ions, respectively. Samples E21 and E22 were obtained by ion exchange reaction or by end parent member redistribution reaction methods. The experimental conditions were essentially the same as that used in Examples E3 and E6. In the specification the terms "proton" or "protonated" refer to any aqueous form of the proton including the hydronium ion.

EXAMPLES 23–24

These examples illustrate the reduction of hydrophobic character for homostructured organic-inorganic mixed ion clays relative to homoionic organoclays and suitability of these compositions for forming tractable clay suspensions in organic solvents.

In Example 23, a 2.0 g quantity of 18A-HECTABRITE AW-100%-E (E1) was dispersed in 18 ml of chloroform at room temperature. After about 2 minutes stirring, the suspension formed a thick intractable gel, as expected for a 10 wt % dispersion of organoclay. The XRD basal spacing for the clay was 36 Å. The gel was essentially useless as a catalyst or absorbent because it could not be readily recovered from the gel by filtration.

In Example 24, a 2.0 g quantity of homostructured organic-inorganic mixed ion clay 18A-HECTABRITE AW-50%-E (E3) was mixed with 18 ml of chloroform. After stirring for 60 minutes, the mixture remained as suspension that was readily filterable. The XRD basal spacing of the chloroform solvated mixed ion clay (E3) was 35 Å. Doubling the amount of mixed ion clay provided a suspension in which the molar ratio of the onium ion to organic solvent was equal to that used in Example 23. Yet, the homostructured mixed ion clay did not form a gel and remained a tractable suspension.

EXAMPLE 25

Example 25 demonstrates the formation of homostructured organic-inorganic mixed ion clay from non-acidic clay (16A3M-HECTABRITE AW) and acidic clay (H-HECTABRITE AW) from re-distribution reaction. The newly formed clay had galleries occupied by 16A3M$^+$ and H$^+$. The clay was sufficiently acidic to catalyze intragallery epoxy-amine polymerization and form exfoliated nanocomposites analogous to those described in Example 19.

EXAMPLE 26

Example 26 demonstrates the formation of homostructured organic-inorganic mixed ion clay from different smectite silicate layers by using parent members redistribution reaction. Parent members were 18A-fluorohectorite and Na-montmorillonite. A 2-g quantity of 18A-fluorohectorite was dispersed in a 100 ml ethanol. The 18A-fluorohectorite ethanol suspension was mixed with 100 ml of 2 wt % Na-montmorillonite water suspension. The final mixture was blended in a blender at room temperature for 5 minutes then air dried. The final product (E26) had a basal spacing at 23 Å. (The basal spacings of 18A-fluorohectorite and Na-montmorillonite are 31 Å and 18 Å, respectively.) By using the reaction condition analogous to those described in Examples 17–19, the epoxy composite containing 10 wt % of E26 exhibited diffraction peaks at 100 Å ($d_{001}$), 50 Å ($d_{002}$) and was an exfoliated nanocomposite.

EXAMPLE 27

Figure 4:
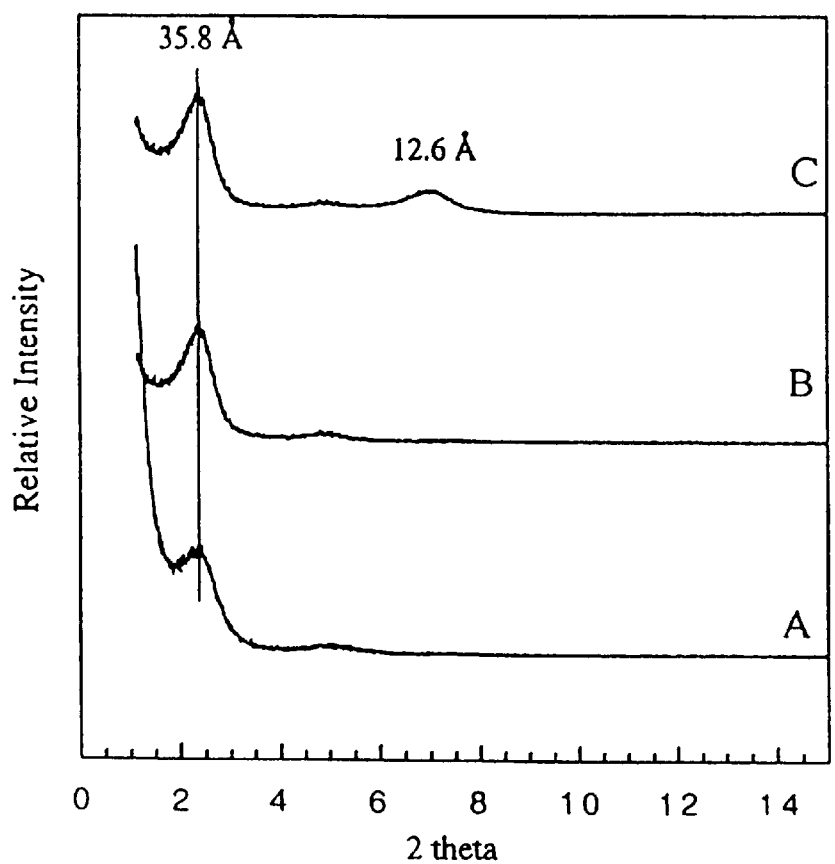
FIG. 4 is a graph of XRD patterns (Cu—$K_\alpha$) for clay samples solvated by epoxy resin (EPON 828) at 75° C. A: fully exchanged 18A-HECTABRITE AW (E1); B: homostructured 1:1 18A/Na-HECTABRITE AW (E3); and C: phase segregated (E2) 18A-HECTABRITE AW (50 wt %) and Na-HECTABRITE AW (50 wt %). All samples have clay loading of 10 wt % (Example 27).

Example 27 demonstrates the swelling property of the homostructured clays compared with phase segregated and homoionic organo clays. 1.0 g of clay sample was added to 9 g EPON 828 epoxy resin and was stirred at 75° C. for 30 minutes. The mixture was placed on a glass plate and measured XRD diffraction. The diffraction patterns are shown in FIG. 4. Homostructured (E3) and homoionic clays (E1) had same basal spacing after epoxy solvation (35.8 Å) and the phase segregated clay (E2) exhibited epoxy solvated phase (35.8 Å) and non-swollen Na-HECTABRITE phase (12.6 Å).

Exfoliated nanocomposites formed from the homostructured partially exchanged inorgano/organo clays of this invention exhibit greatly improved mechanical properties which is comparable to the composites prepared from fully exchanged organoclays.

The use of fully onium ion exchanged clays is described in our U.S. patent application Ser. No. 08/498,350 filed Jul. 7, 1995 for preparing flexible epoxy resin composites from fully onium ion exchanged clays. The use of fully protonated clays is described in U.S. patent application Ser. No. 08/665, 518, filed Jun. 17, 1996. The present invention is an improvement over these earlier applications because of the need for less onium ion. The disclosure of these earlier applications are incorporated herein by reference.

It is intended that the foregoing description be only illustrative of the present invention and that the present invention be limited only by the hereinafter appended claims.

We claim:

1. A particulate composition used to prepare a polymer and layered inorganic composition composite which comprises:

a polymer component intercalated into the particles of a layered inorganic clay composition with nanolayers and with galleries between the nanolayers wherein the layered inorganic composition has cation exchange sites with each gallery between two layers co-occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10; and wherein in use of the particulate composition the nanolayers are separated by a polymer precursor or polymer melt which is introduced into the galleries of the inorganic layered composition and combines with the polymer component and wherein the weight ratio of the polymer component to layered inorganic composition is between about 1:100 and 100:1.

2. A particulate composition used to prepare a polymer and 2:1 layered silicate hybrid composite which comprises:

a polymer component intercalated into particles of a 2:1 layered silicate clay with nanolayers and with galleries between the nanolayers wherein the 2:1 layered silicate has cation exchange sites with each gallery between two layers co-occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10 and wherein in use of the particulate composition the nanolayers are separated by a polymer precursor or polymer melt which is introduced into the galleries of the 2:1 layered silicate wherein the weight ratio of the polymer component to the 2:1 layered silicate is in the range 1:100 to 100:1.

3. The composition of claim 1 wherein the polymer polymerizing component is a monomer or oligomer for the polymer which produces the cured polymer.

4. The composition of claim 2 wherein the polymer polymerizing component and the polymer precursor form a thermoset cured polymer.

5. The composition of claim 2 wherein the polymer polymerizing component and the polymer precursor or polymer melt form a thermoplastic polymer.

6. The composition of claim 1 wherein the layered inorganic composition is selected from the group consisting of a crystalline sheet silicate, a phosphate, an arsenate, a titanate, a vanadate, a niobate, a molybdate, a uranyl compound and a manganate.

7. The composition of claim 1 wherein the polymer polymerizing component for reaction with the polymer precursor or polymer melt is selected from the group consisting of an amine, an amide, an anhydride, an epoxide, an isocyanate, alcohol and a vinyl polymerizing agent.

8. The composition of claim 1 wherein the polymer polymerizing component is selected from the group consisting of an amine, an amide, an imide, an epoxide, a hydroxide, a pyridinyl, a pyrrolyl and a vinyl group.

9. The composition of claim 1 with the polymer precursor to be introduced into the galleries provides a cured thermoset polymer selected from the group consisting of an epoxy, a polyurethane, a polyurea, a alkyd, a polysiloxane, a polyester and a polyimide polymer.

10. The composition of claim 1 wherein the polymer precursor to be introduced into the galleries is selected from the group consisting of a diglycidyl ether of bisphenol A epoxide, a diglycidyl ether of bisphenol F epoxide, a Novolac epoxide, a diglycidyl polyalkyleneether epoxide, and a epoxypropoxypropyl terminated polydimethylsiloxane.

11. The composition of claim 1 wherein the polymer polymerizing component is selected from the group consisting of a polyoxypropylene diamine, a polyoxypropylene triamine, a polyamide, and a aminopropyl terminated polydimethylsiloxane which provides crosslinking and curing of an epoxy resin and wherein the polymer precursor is an epoxy resin.

12. The composition of claim 2 wherein 2:1 layered silicate is selected from the group consisting of a smectite clay, a synthetic smectite derivative, a mixed layered clay, a synthetic mixed layered clay, a vermiculite, a hydromica, a mica, a synthetic mica-like derivative and mixtures thereof.

13. The composition of any one of claims 1 or 2 wherein at least 10% by number of the cation exchange sites of the layered inorganic composition are occupied by the onium ions.

14. The composition of claim 2 in which the particles have an average diameter between about 20 and 200,000 nm.

15. A hybrid organic-inorganic composite material containing a cured polymer and particles of a layered inorganic clay composition having galleries between the layers, the galleries containing the polymer, wherein the layered inorganic composition has cation exchange sites with each gallery between two layers co-occupied by onium ions and inorganic ions selected from the group consisting of protons, alkali metal and alkaline earth metal ions and mixtures thereof in each of the galleries in a mole ratio of onium ion to inorganic ions of between about 10 to 90 and 90 to 10 prior to curing of the polymer, wherein the ratio by weight of polymer to the layered inorganic composition is between about 200:1 and 1:100, wherein an average separation between the layers corresponds to a height of the galleries of about 0.4 to 300 nm and wherein the particles have an average diameter of between about 20 and 200,000 nm and a ratio of diameter to thickness of the particles in a range between about 20,000:1 and 20 to 1.

16. The composite material according to claim 15 wherein the composite is formed by mixing a composition consisting of a polymer polymerizing component and the layered inorganic composition and then curing the mixture.

17. A hybrid organic-inorganic composite material containing a cured polymer and particles of a layered 2:1 layered silicate clay particles having galleries between the layers, the galleries containing the polymer, wherein the silicate has cation exchange sites with each gallery between two layers co-occupied by onium ions and inorganic ions selected from the group consisting of protons, alkali metal and alkaline earth metal ions and mixtures thereof in each of the galleries in a mole ratio of onium ions to inorganic ions of between about 10 to 90 and 90 to 10 prior to curing of the polymer, with the proton bonded to the polymer, wherein the ratio by weight of polymer to layered silicate is between about 200:1 and 1:100, wherein an average separation between the layers corresponds to a height of the galleries of about 0.4 to 300 nm and wherein the particles have an average diameter of between about 20 and 200,000 nm and a ratio of diameter to thickness of the particles in a range between about 20,000:1 and 20 to 1.

18. The composite material of claim 17 wherein the composite is formed by mixing a composition consisting of a polymer polymerizing component and the 2:1 layered silicate and then curing the mixture.

19. The composite material of any one of claims 15 or 17 wherein the cured polymer is a thermoset.

20. The composition of any one of claims 15 or 17 wherein the cured polymer is selected from the group consisting of an epoxy, a polyurethane, a polyurea, a alkyd, a polysiloxane, a polyester, and a polyimide polymer.

21. The composition of any one of claims 15 or 17 wherein the cured polymer is formed by an epoxy resin precursor and an amine curing agent.

22. The composition of claim 21 wherein the epoxy resin precursor is selected from the group consisting of a diglycidyl ether of bisphenol A epoxide, a diglycidyl ether of bisphenol F epoxide, a Novolac epoxide, a diglycidyl polyalkyleneether epoxide, and an epoxypropoxypropyl terminated polydimethylsiloxane.

23. The composition of claim 21 wherein the amine curing agent for the epoxy polymer precursor is selected from the group consisting of a polyoxypropylene diamine, a polyoxypropylene triamine, a polyamide, and an aminopropyl terminated polydimethylsiloxanes.

24. The composition of claim 17 wherein the 2:1 layered silicate is selected from the group consisting of a smectite clay, a synthetic smectite derivative, a mixed layered clay, a synthetic mixed layered clay, a vermiculite; a mica, a hydromica, and a synthetic mica-like derivative.

25. A method for the preparation of a composition which comprises:
(a) providing a layered inorganic clay composition and with nanolayers and galleries between the nanolayers and with proton cation exchanged sites with each gallery between two nanolayers co-occupied by onium ions and inorganic ions selected from the group consisting of protons, alkali metal and alkaline earth metal ions and mixtures thereof in each of the galleries in a mole ratio of onium ion to inorganic ions of between about 10 to 90 and 90 to 10; and
(b) intercalating a polymer polymerizing component into the galleries of the layered inorganic composition, wherein the composition can be used to form a cured polymer.

26. A method for the preparation of a composition which comprises:
(a) providing a 2:1 layered silicate clay with nanolayers and galleries between the nanolayers with proton cation exchanged sites with each gallery between two nanolavers co-occupied by onium ions and inorganic ions selected from the group consisting of protons, alkali metal and alkaline earth metal ions and mixtures thereof in each of the galleries in a mole ratio of onium ion to inorganic ions of between about 10 to 90 and 90 to 10; and
(b) intercalating a polymer polymerizing component into the galleries of the 2:1 layered silicate, wherein the composition can be mixed with a polymer, and used to form a cured polymer.

27. The method of claim 26 wherein the 2:1 layered silicate containing the protons is obtained by a method selected from the group consisting of a direct onium ion exchange of the 2:1 layered silicate.

28. The method of claim 26 wherein the intercalation of the polymer polymerizing component is in a solvent.

29. The method of any one of claims 25 or 26 wherein the intercalation is of the polymer polymerizing component alone in a liquid form.

30. The method of any one of claims 25 or 26 wherein the cured polymer is selected from the group consisting of an epoxy, a polyurethane, a polyurea, an alkyd, a polysiloxane, a polyester, and a polyimide polymer.

31. The method of claim 26 wherein the cured polymer is an epoxy polymer.

32. The method of claim 31 wherein the cured epoxy polymer is crosslinked by an epoxy resin and an amine curing agent.

33. The method of claim 25 wherein the polymer component is an epoxy resin precursor and the epoxy resin precursor is selected from the group consisting of a diglycidyl ether of bisphenol A epoxide, a diglycidyl ether of bisphenol F epoxide, a Novolac epoxide, a diglycidyl polyalkyleneether epoxide, and a epoxypropoxypropyl terminated polydimethylsiloxane.

34. The method of claim 25 wherein the polymer polymerizing component is an amine curing agent which produces a cured polymer selected from the group consisting of an epoxy polymer, a polyoxypropylene diamine, a polyoxypropylene triamine, a polyamide, and an aminopropyl terminated polydimethylsiloxane.

35. The method of claim 26 wherein the 2:1 layered silicate is selected from the group consisting of a smectite clay, a synthetic smectite derivative, a mixed layered clay, a synthetic mixed layered clay, a vermiculite, a mica, hydromica and a synthetic mica-like derivative.

36. A method for the preparation of a cured polymer composite comprising a polymer component and a layered inorganic clay component with nanolayers and galleries between the monolayers wherein:

(i) the layered inorganic composition has cation exchange sites with each gallery between two nanolayers co-occupied by onium ions and inorganic ions selected from the group consisting of protons, alkali metal and alkaline earth metal ions and mixtures thereof in each of the nanolayers in a mole ratio of onium ions to inorganic ions between about 10 to 90 and 90 to 10;

(ii) a polymer precursor or polymer melt;

(iii) the inorganic layers are separated by the polymer precursor or polymer melt in the galleries; and (iv) the weight ratio of the polymer precursor or polymer melt to the layered inorganic composition is between about 1:100 to 100:1, which comprises:

(a) providing in a mixture the curable composition with the polymer precursor or polymer melt; and (b) mixing the mixture at a temperature and for a time to produce the polymer composite, wherein the galleries contain the polymer.

37. A method for the preparation of a polymer composite prepared from a curable composition comprising a polymer and a 2:1 layered silicate clay with nanolayers and galleries between the monolayers wherein:

(i) the 2:1 layered silicate has cation exchange sites with each gallery between two nanolayers co-occupied by onium ions and inorganic ions selected from the group consisting of protons, alkali metal and alkaline earth metal ions and mixtures thereof in each of the galleries in a mole ratio of onium ions to inorganic ions between about 10 to 90 and 90 to 10;

(ii) a polymer precursor or polymer melt;

(iii) the silicate layers are separated by the polymer precursor or polymer melt in the galleries; and (iv) the weight ratio of the polymer precursor or polymer to the layered silicate is between about 1:100 to 100:1, which comprises:

(a) providing in a mixture the composition with the polymer precursor or polymer melt; and (b) mixing the mixture at a temperature and for a time to produce the cured composite, wherein the galleries contain the polymer.

38. The method of any one of claims 36 or 37 wherein the cured polymer is selected from the group consisting of an epoxy, a polyurethane, a polyurea, an alkyd, a polysiloxane, a polyester, and a polyimide polymer.

39. The method of any one of claims 36 or 37 wherein the cured polymer is an epoxy polymer.

40. The method of any one of claims 36 or 37 wherein the polymer is prepared from an epoxy polymer precursor as the polymer precursor and an amine curing agent.

41. The method of any one claims 36 or 37 wherein the polymer precursor is selected from the group consisting of a diglycidyl ether of bisphenol A epoxide, a diglycidyl ether of bisphenol F epoxide, a Novolac epoxide, a diglycidyl polyalkyleneether epoxide, and an epoxypropoxypropyl terminated polydimethylsiloxane.

42. The method to claim 40 wherein an amine curing agent for epoxy polymer precursor is a polyoxypropylene diamine, a polyoxypropylene triamine, a polyamide, and an aminopropyl terminated polydimethylsiloxane.

43. The method of claim 37 wherein the cation exchangeable 2:1 layered silicate is selected from the group consisting of a smectite clay, a synthetic smectite derivative, a mixed layered clay, a synthetic mixed layered clay, a vermiculite, a mica, a hydromica, and a synthetic mica-like derivative.

44. The composite material according to claim 15 wherein the composite is formed by mixing a composition consisting of a polymer polymerizing component and the layered inorganic composition and then blending the composition with a polymer melt.

45. The composite material of any one of claims 15 or 17 wherein the composite is formed by mixing a composition consisting of a polymer polymerizing component and the 2:1 layered silicate and then blending the composition with a polymer melt.

46. The composition of claim 5 wherein the thermoplastic polymer is selected from the group consisting of a polyamide, a protein, a polyester, a polyether, a polyurethane, a polysiloxane, a phenol-formaldehyde, a urea-formaldehyde, a melamine-formaldehyde, a cellulose, a polysulfide, a polyacetal, a polyethylene oxide, a polycaprolactam, a polycaprolacton, a polylactide, a polyimide, and a polyolefin.

* * * * *

UNITED STATES PATENT AND TRADEMARK OFFICE
CERTIFICATE OF CORRECTION

PATENT NO. : 5,866,645
DATED : February 2, 1999
INVENTOR(S) : Thomas J. Pinnavaia, Heng-Zhen Shi and Tie Lan It is certified that error appears in the above-indentified patent and that said Letters Patent is hereby corrected as shown below:

Title page under "Publications", last line, "John Wiley ? Sons" should be --John Wiley & Sons--.

Column 2, line 55, "AsO$_4$}.2H2O" should be --AsO$_4$}.2H$_2$O--.

Column 2, line 53, "NboPO$_4$" should be --NbOPO$_4$--.

Column 3, line 65, "rational 001 reflections" should be --rational 00$\ell$ reflections--.

Column 5, line 36, "(C$_3$H$_7$)NH$_3^{30}$" should be --C$_3$H$_7$)NH$_3^+$--.

Column 6, line 4, "(-0.6)", should be --(~0.6)--.

Column 6 lines 15 and 16, "50%" and "10%", should be -- ~50%-- and -- ~10% --, respectively.

Column 7, line 11, "Theological" should be --rheological--.

Column 25, line 5, " 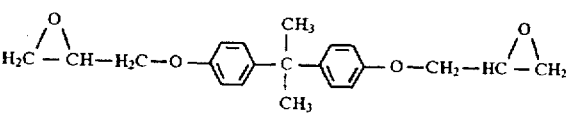 "

should be -- 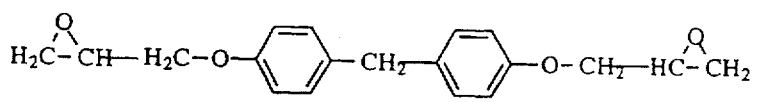 --.

Column 28, line 1, "18Å" should be --18A--.

UNITED STATES PATENT AND TRADEMARK OFFICE
CERTIFICATE OF CORRECTION

PATENT NO.  : 5,866,645
DATED       : February 2, 1999
INVENTOR(S) : Thomas J. Pinnavaia, Heng-Zhen Shi and Tie Lan It is certified that error appears in the above-indentified patent and that said Letters Patent is hereby corrected as shown below:

Column 28, line 37, "70°-75°" should be --70°-75°C--.

Column 29, line 67, "N(CH$_3$)$_3$" should be --N(CH$_3$)$_3^+$ --.

Column 38, line 28 (Claim 41), "any one claims" should be --any one of claims--.

Column 38, line 34 (Claim 42), "to Claim 40" should be --of Claim 40--.

Signed and Sealed this

Twenty-third Day of November, 1999

Q. TODD DICKINSON

Attest:

Attesting Officer

Acting Commissioner of Patents and Trademarks